United States Patent [19]

Hayashi et al.

[11] Patent Number: 4,875,390
[45] Date of Patent: Oct. 24, 1989

[54] SHIFT CONTROL DEVICE FOR HYDROSTATIC CONTINUOUSLY VARIABLE TRANSMISSION

[75] Inventors: Tsutomu Hayashi; Masaie Katoh, both of Tokyo; Nobuyuki Yakigaya, Chiba; Kazuhiko Nakamura, Kanagawa; Yoshihiro Yoshida; Yoshihiro Nakajima, both of Tokyo; Mitsuru Saito, Tokyo; Akio Kobayashi, Saitama, all of Japan

[73] Assignee: Honda Giken Kogyo Kabushiki Kaisha, Tokyo, Japan

[21] Appl. No.: 28,528

[22] Filed: Mar. 20, 1987

[30] Foreign Application Priority Data

Mar. 24, 1986 [JP] Japan .................. 61-65484
Apr. 8, 1986 [JP] Japan .................. 61-80812

[51] Int. Cl.4 ........................... F16H 47/04
[52] U.S. Cl. ........................ 74/731; 74/687; 74/681
[58] Field of Search ............. 74/687, 681, 731, 732, 74/60, 425; 192/59; 417/222; 91/506; 60/487; 92/12.2

[56] References Cited

U.S. PATENT DOCUMENTS

| | | | |
|---|---|---|---|
| 24,317 | 5/1957 | Schott | 60/53 |
| 1,263,180 | 4/1918 | Williams | 60/487 X |
| 1,533,399 | 4/1925 | Dunlap | 60/487 |
| 2,272,771 | 2/1942 | Hawley | 91/505 |
| 2,388,462 | 11/1945 | Beeh | 103/173 |
| 2,395,980 | 3/1946 | Wahlmark | 60/53 |
| 4,232,572 | 11/1980 | Ross | 74/859 |
| 4,487,108 | 12/1984 | McLuen | 92/12.2 |
| 4,650,056 | 3/1987 | Sevennec et al. | 192/995 X |
| 4,715,258 | 12/1987 | Shigematsu | 74/866 |
| 4,727,771 | 3/1988 | Niwa | 74/866 |
| 4,735,050 | 4/1988 | Hayashi | 60/489 |
| 4,741,251 | 5/1988 | Hayashi | 92/57 |
| 4,745,748 | 5/1988 | Hayashi | 60/489 |
| 4,748,898 | 6/1988 | Hayashi | 92/12.2 |

(List continued on next page.)

FOREIGN PATENT DOCUMENTS

| | | |
|---|---|---|
| 143921 | 12/1935 | Australia . |
| 23390 | 8/1936 | Australia . |
| 143400 | 5/1950 | Australia . |
| 231526 | 4/1959 | Australia . |
| 268529 | 11/1963 | Australia . |
| 240661 | 6/1965 | Australia . |
| 0186500 | 2/1986 | European Pat. Off. . |
| 317649 | 12/1919 | Fed. Rep. of Germany . |
| 880989 | 7/1949 | Fed. Rep. of Germany . |
| 191742 | 9/1957 | Fed. Rep. of Germany ....... 92/12.2 |
| 1200135 | 9/1965 | Fed. Rep. of Germany . |
| 1480553 | 6/1969 | Fed. Rep. of Germany . |

(List continued on next page.)

Primary Examiner—Leslie A. Braun
Assistant Examiner—William Gehris
Attorney, Agent, or Firm—Lyon & Lyon

[57] ABSTRACT

A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted on the swash plate, wherein a drive shaft of a reversible electric motor is connected to the trunnion shaft through a reduction device which is constructed so that it transmits the rotation of the electric motor to the trunnion shaft at a reduced speed, but is brought into a locked state upon receipt of a reverse load from the trunnion shaft. This enables light adjustment of the tilting angle of the motor swash plate by use of a small-sized electric motor and reliable holding of the motor swash plate in a position at any angle.

24 Claims, 21 Drawing Sheets

U.S. PATENT DOCUMENTS

| | | | |
|---|---|---|---|
| 2,651,386 | 9/1953 | Rossell | 188/98 |
| 2,662,375 | 10/1947 | Postel et al. | 60/490 X |
| 2,683,421 | 7/1954 | Woydt | 103/161 |
| 2,844,002 | 7/1958 | Pavesi | 60/53 |
| 2,907,230 | 10/1959 | Kollman | 74/687 |
| 2,957,421 | 10/1960 | Mock | 92/12.2 |
| 2,984,070 | 5/1961 | Bauer | 60/53 |
| 3,036,434 | 5/1962 | Mark | 60/53 |
| 3,054,263 | 9/1962 | Budzich | 60/53 |
| 3,065,700 | 11/1962 | Blenkle | 92/12.2 |
| 3,131,539 | 5/1964 | Creighton | 60/53 |
| 3,133,418 | 5/1964 | Froebe | 60/53 |
| 3,143,858 | 8/1964 | Roeske | 60/53 |
| 3,165,892 | 1/1965 | Roberts | 60/53 |
| 3,170,297 | 2/1965 | Larson | 60/53 |
| 3,175,363 | 3/1965 | Molly | 60/53 |
| 3,187,868 | 6/1965 | Gantzer | 192/101 |
| 3,190,232 | 6/1965 | Budzich | 417/222 |
| 3,204,411 | 9/1965 | Stockton | 60/492 |
| 3,213,619 | 10/1965 | Creighton | 60/53 |
| 3,238,723 | 3/1966 | Young | 60/444 |
| 3,274,947 | 9/1966 | Jonkers | 103/162 |
| 3,313,108 | 4/1967 | Allgaier | 60/53 |
| 3,372,545 | 3/1968 | Hyde | 60/487 |
| 3,373,635 | 3/1968 | Meurer | 74/687 |
| 3,382,813 | 5/1968 | Schauer | 103/162 |
| 3,416,312 | 12/1968 | Margolin | 60/53 |
| 3,455,184 | 7/1969 | Frandsen et al. | 74/687 |
| 3,543,514 | 12/1970 | Reimer | 60/53 |
| 3,620,130 | 11/1971 | Roberts | 91/506 |
| 3,646,754 | 3/1972 | Koch et al. | 60/390 |
| 3,698,189 | 10/1972 | Reimer | 60/53 A |
| 3,733,931 | 5/1973 | Nyman | 74/868 |
| 3,834,164 | 9/1974 | Ritter | 60/492 |
| 3,910,043 | 10/1975 | Clerk | 60/413 |
| 4,080,992 | 3/1978 | Niederer | 137/636 |
| 4,086,822 | 5/1978 | Kuroda | 74/473 R |
| 4,102,131 | 7/1978 | Reynolds | 60/431 |
| 4,170,279 | 10/1979 | Pelletier | 188/300 |

FOREIGN PATENT DOCUMENTS

| | | | |
|---|---|---|---|
| 1500480 | 7/1969 | Fed. Rep. of Germany . | |
| 1625039 | 5/1970 | Fed. Rep. of Germany . | |
| 1951381 | 4/1971 | Fed. Rep. of Germany . | |
| 2456473 | 8/1976 | Fed. Rep. of Germany . | |
| 3139191 | 4/1983 | Fed. Rep. of Germany . | |
| 791714 | 6/1935 | France . | |
| 32-7159 | of 1957 | Japan . | |
| 41-3208 | of 1966 | Japan . | |
| 46-11852 | 3/1971 | Japan . | |
| 56-143856 | 11/1981 | Japan . | |
| 57-70968 | 5/1982 | Japan . | |
| 59-38467 | 9/1984 | Japan . | |
| 0069278 | 4/1985 | Japan | 417/222 |
| 0216080 | 10/1985 | Japan | 417/222 |
| 61-153057 | 7/1986 | Japan . | |
| 473997 | 7/1969 | Switzerland . | |
| 535555 | 4/1941 | United Kingdom . | |
| 574991 | 1/1946 | United Kingdom . | |
| 835936 | 5/1960 | United Kingdom . | |
| 890591 | 3/1962 | United Kingdom | 92/12.2 |
| 902978 | 8/1962 | United Kingdom . | |
| 1021873 | 3/1966 | United Kingdom . | |
| 1222200 | 2/1971 | United Kingdom . | |
| 1282094 | 7/1972 | United Kingdom . | |
| 1521494 | 8/1978 | United Kingdom . | |
| 2104976 | 3/1983 | United Kingdom . | |

OTHER PUBLICATIONS

G. Niemann, "Maschinenelemente", pp. 68, 82 & 83 (1983).

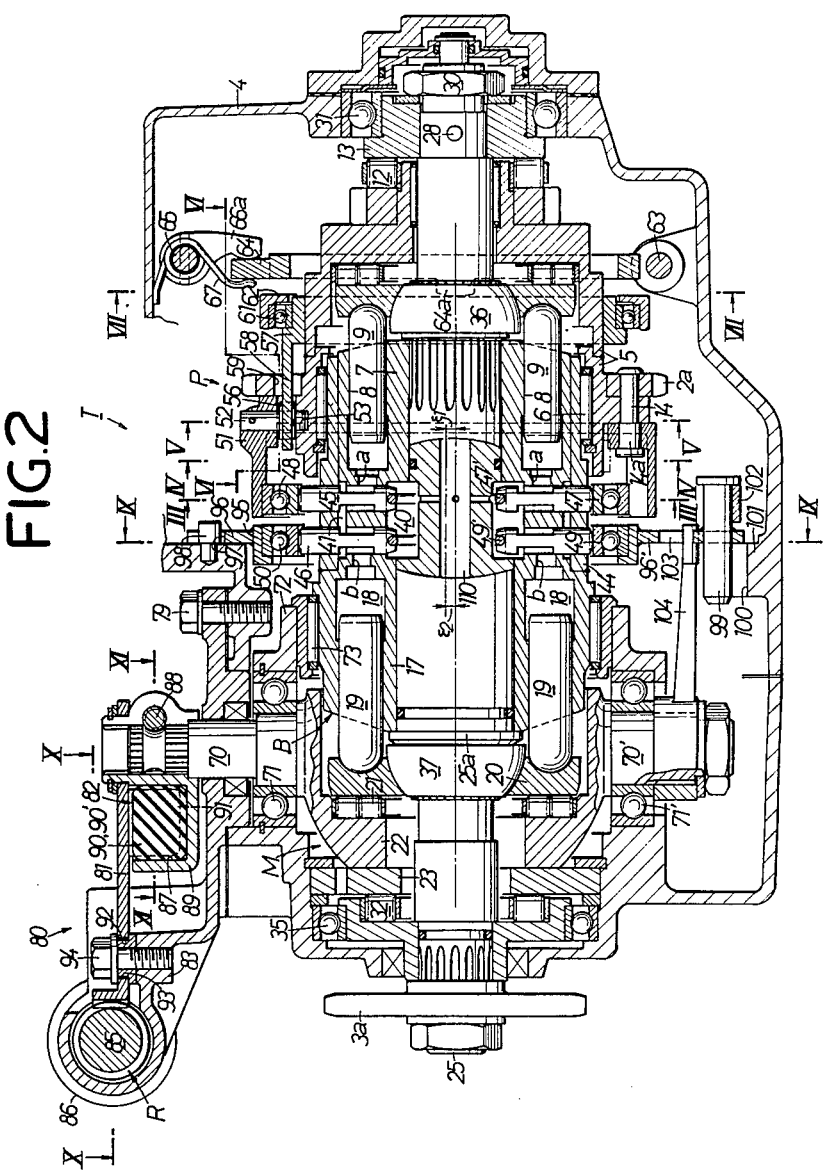

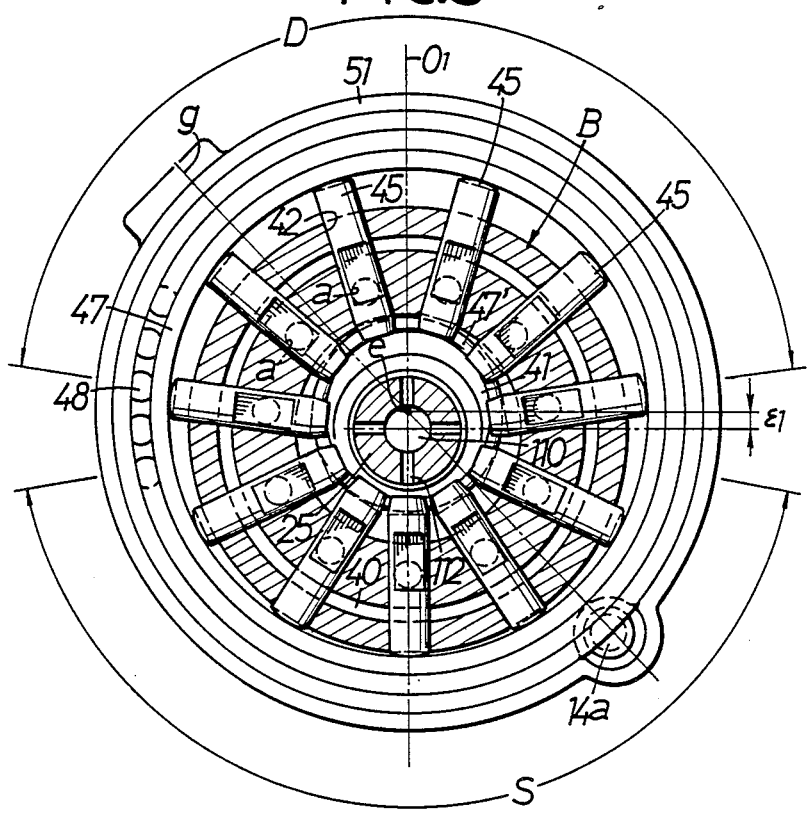

SHIFT CONTROL DEVICE FOR HYDROSTATIC CONTINUOUSLY VARIABLE TRANSMISSION

BACKGROUND OF THE INVENTION

1. Field of the Invention

The present invention relates to a shift control device in a hydrostatic transmission in which a hydraulic closed circuit is formed between a swash plate type hydraulic pump and a swash plate type hydraulic motor and a swash plate holder for supporting a motor swash plate of the hydraulic motor is tiltably supported on a stationary structure through a trunnion shaft fixedly mounted on the swash plate holder, the shift control device being constructed so that the angle of the motor swash plate is adjustable to control the volume of the hydraulic motor in order to control a shift ratio.

2. Description of the Prior Art

It is known to connect a hydraulic servo motor to a motor swash plate so as to enable the angle of the motor swash plate to be lightly adjusted (see Japanese Patent Publication No. 38467/84).

In the above prior art, the hydraulic servo motor is complicated in structure and expensive and for this reason, an increase in cost of a shift control device can not be avoided.

SUMMARY OF THE INVENTION

The present invention has been accomplished with such circumstances in view and it is an object of the invention to provide a shift control device the type as described above which is decreased in cost and in which the angle of a motor swash plate can be reliably adjusted by use of a relatively inexpensive small-sized electric motor. To accomplish the above object, the feature of the present invention is in that a drive shaft of reversible electric motor is connected to a trunnion shaft through a reduction device which is constructed to transmit the rotation of the electric motor to the trunnion shaft at a reduced speed, but which is brought into a locked state upon receipt of a reverse load.

Upon normal rotation or reverse rotation of the electric motor, such rotation is decelerated by the reduction device and transmitted to the trunnion shaft, thereby causing the motor swash plate to be tilted in an upstanding or tilted-down direction and hence, the angle of the motor swash plate can be lightly adjusted even if the electric motor is small sized.

Moreover, since the reduction device assumes the locked state upon receipt of the reverse load from the trunnion shaft so as not to allow the trunnion shaft to rotate, the motor swash plate can be reliably maintained in a desired position at any angle by stopping the operation of the electric motor.

It may further be contemplated that an operating lever is secured to the trunnion shaft and the lever is operatively connected with a piston slidably received in a stationary cylinder, and first and second oil chambers defined between the cylinder and the piston and opposed to each other with the piston sandwiched therebetween are interconnected through a hydraulic conduit, and that interposed in the hydraulic conduit is a control valve selectively switchable into a hold position in which the conduit is brought into a blocked state during inoperative state of the electric motor, a decelerating position in which during normal rotation of the electric motor, the conduit is brought into a state to communicate only in one direction from the first oil chamber to the second oil chamber and an accelerating position in which during reverse rotation of the electric motor, the conduit is brought into a state to communicate only in one direction from the second oil chamber to the first oil chamber. If the shift control device includes the above construction, it is advantageous in the following respects:

Since the control valve assumes the hold position during inoperative state of the electric motor to bring the hydraulic conduit into the blocked state, the piston can be hydraulically locked to hold the motor swash plate in an upright or inclined state, which further effectively prevents reverse load from acting on the electric motor.

Since the control valve is switched into the accelerating position during normal rotation of the electric motor to bring the hydraulic conduit into the state to communicate only in one direction from the first oil chamber to the second oil chamber, the electric motor can be lightly rotated in a normal direction without receiving any reverse load thereby to move the motor swash plate in a standing direction.

Since the control valve is switched into the decelerating position during reverse rotation of the electric motor to bring the hydraulic conduit into the state to communicate only in one direction from the second oil chamber to the first oil chamber, the electric motor can be likewise lightly reversed without receiving any reverse load to tilt down the motor swash plate.

The above and other objects, features and advantages of the invention will become apparent from reading of the following detailed description of the preferred embodiments taken in conjunction with the accompanying drawings.

BRIEF DESCRIPTION OF THE DRAWINGS

The accompanying drawings illustrate several preferred embodiments of the present invention.

FIGS. 1 to 11 illustrate a first embodiment, wherein

FIG. 1 is a longitudinal sectional view of a hydrostatic continuously variable transmission incorporated in a power transmitting system for a motorcycle;

FIG. 2 is a back view in longitudinal section of the transmission;

FIG. 3 is a sectional view taken along line III—III in FIG. 2;

FIGS. 4, 5, 6 and 7 are sectional views taken along lines IV—IV, V—V, VI—VI, and VII—VII in FIG. 2, respectively;

FIG. 8 is a perspective view of first or second distributor valve;

FIG. 9 is a sectional view taken along line IX—IX in FIG. 2;

FIGS. 10 and 11 are sectional views taken along lines X—X and XI—XI in FIG. 2.

FIGS. 12 to 22 illustrate a second embodiment, wherein

FIG. 12 is a plan view in longitudinal section of a hydrostatic continuously variable transmission incorporated in a power transmitting system for a motorcycle;

FIG. 13 is a back view in longitudinal section of the transmission;

FIGS. 14 and 15 are sectional views taken along lines XIV—XIV and XV—XV in FIG. 13;

FIG. 16 is a perspective view of a first distributor valve;

FIG. 17 is a perspective view of a second distributor valve;

FIG. 18 is a sectional view taken along line XVIII-—XVIII in FIG. 15;

FIG. 19 is a sectional view taken along line XIX-—XIX in FIG. 13;

FIG. 20 is a front view in longitudinal section of a shift assisting device;

FIG. 21 is a sectional view taken along line XXI-—XXI in FIG. 20; and

FIG. 22 is a block diagram illustrating an arrangement of an electronic control circuit.

DESCRIPTION OF THE PREFERRED EMBODIMENTS

Figure 1:
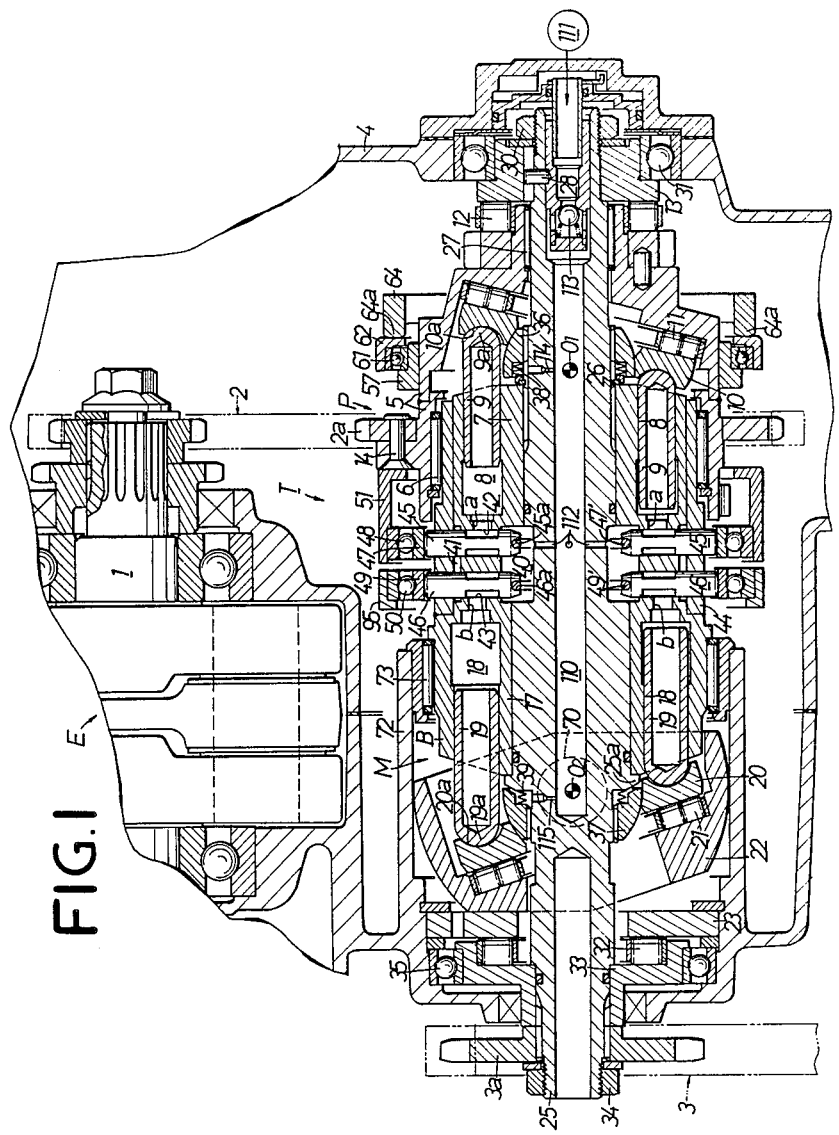

The present invention will now be described by way of several embodiments with reference to the accompanying drawings. Like reference characters designate like parts throughout these embodiments.

FIGS. 1 to 11 illustrate a first embodiment. Referring first to FIGS. 1 and 2, power from an engine E of a motorcycle is transmitted from a crank shaft 1 through a chain type primary reduction gear 2, a hydrostatic continuously variable transmission T and a chain type secondary reduction gear 3 to a rear wheel which is not shown.

The continuously variable transmission T is comprised of a swash plate type constant volume hydraulic pump P and a swash plate type variable volume hydraulic motor M and is contained in a casing provided by a crank case 4 which supports the crank shaft 1.

The hydraulic pump P is constituted of a cup-like input member 5 to which an output sprocket 2a of the primary reduction gear 2 is connected by three rivets 14 . . , a pump cylinder 7 relatively rotatable fitted in the inner peripheral wall of the input member 5 through a needle bearing 6, pump plungers 9, 9 --- each slidably fitted in each of an odd number of annularly arranged cylinder bores 8, 8 --- provided in the pump cylinder 7 around the center of axis of rotation thereof, and a pump swash plate 10 abutting against the outer ends of the pump plungers 9.

The pump swash plate 10 is rotatably supported at its back surface on an inner end wall of the input member 5 in an attitude inclined about a phantom trunnion axis 01 perpendicular to the axis of the pump cylinder 7 and at a given angle with respect to the axis of the pump cylinder 7, so that the pump plungers 9, 9 --- can be permitted to reciprocate during rotation of the input member 5 to repeat suction and discharge strokes.

It is to be noted that a spring for biasing the pump plunger 9 in the projecting direction may be mounted in compression in the cylinder bore 8 to improve a follow-up of the pump plunger 9 relative to the pump swash plate 10.

The input member 5 is supported at its back surface on a support tube 13 through thrust roller bearing 12.

On the other hand, the hydraulic motor M is constituted of a motor cylinder 17 disposed coaxially with the pump cylinder 7 on the left side thereof, motor plungers 19, 19 --- each slidably fitted in each of an odd number of annularly arranged cylinder bores 18, 18 --- provided in the motor cylinder 17 around the center or axis of rotation thereof, a motor swash plate 20 abutting against the outer ends of the motor plungers 19, 19 ---, a swash plate holder 22 for supporting the back surface of the motor swash plate 20 through thrust roller bearing 21, and a swash plate anchor 23 for supporting the swash plate holder 22.

The motor swash plate 20 is adapted to tilt between an upright position in which it is perpendicular to the axis of the motor cylinder 17 and a maximum inclined position in which it is inclined at a certain angle, so that in the inclined position, the motor swash plate 20 can permit the motor plungers 19, 19 --- to reciprocate along with the rotation of the motor cylinder 17 to repeat expansion and retraction strokes.

It is to be noted that a spring for biasing the plunger 19 in the projecting direction may be mounted in compression in the cylinder bore 18 to improve the follow-up of the motor plunger 19 relative to the motor swash plate 20.

The pump cylinder 7 and the motor cylinder 17 constitute an integral cylinder block B, and an output shaft 25 centrally penetrates through the cylinder block B. The outer end of the motor cylinder 17 is mated against a flange 25a integrally formed around the outer periphery of the output shaft 25, and the pump cylinder 7 is spline-fitted over the output shaft 25. Further, a circlip 26 abutting against the outer end of the pump cylinder 7 is locked to the output shaft 25. Thus it is ensured that the cylinder block B is secured to the output shaft 25.

The output shaft 25 also penetrates through the input member 5 and rotatably supports the input member 5 through a needle bearing 27.

The support tube 13 is fitted over the outer periphery at a right end of the output shaft 25 through a key 28 and is secured by means of a nut 30. The right end of the output shaft 25 is rotatably supported on the crank case 4 through the support tube 13 and a roller bearing 31.

The output shaft 25 also centrally passes through the swash plate holder 22 and the swash plate anchor 23, and a support tube 33 is spline-fitted over a left end of the output shaft 25 for supporting a back surface of the swash plate anchor 23 through thrust roller bearing 32 and is secured to the shaft 25 with the input sprocket 3a of the secondary reduction gear 3 by a nut 34. The left end of the support shaft 25 is rotatably supported on the crank case 4 through the support tube 33 and roller bearing 35.

A hemispherical aligner 36 is slidably spline-fitted over the output shaft 25 and engages an inner peripheral surface of the pump swash plate 10 for relatively tilting movement in all directions. The aligner 36 urges the pump swash plate 10 against the thrust roller bearing 11 by forces of a plurality of Belleville springs 38 to constantly impart an aligning action to the pump swash plate 10.

A hemispherical aligner 37 is also slidably spline-fitted over the output shaft 25 and engages an inner peripheral surface of the motor swash plate 20 for relatively tilting movement in all directions. The aligner 37 urges the motor swash plate 20 against the thrust roller bearing 21 by forces of a plurality of Belleville springs 39 to constantly impart an aligning action to the motor swash plate 20.

To strengthen the aligning action of each of the swash plates 10 and 20 and moreover to prevent slipping in a rotational direction between the pump swash plate 10 and the group of the pump plungers 9, 9 --- and between the motor swash plate 20 and the group of the motor plungers 19, 19 ---, spherical recesses 10a, 20a are made in the swash plates 10, 20 for permitting the engagement of spherical ends 9a, 19a of the plungers 9, 19.

A hydraulic closed circuit will be formed between the hydraulic pump P and the hydraulic motor M in the following manner.

Provided in the cylinder block B between the group of the cylinder bores 8, 8 --- of the pump cylinder 7 and the group of the cylinder bores 18, 18 --- of the motor cylinder 17 are inner and outer annular oil passages 40 and 41 concentrically arranged about the output shaft 25, first and second valve bores 42, 42 --- and 43, 43 ---, of the same number as the cylinder bores 8, 8 --- and 18, 18 ---, which radially penetrate through an annular partition wall between both the oil passages 40 and 41 and the outer peripheral wall of the outer oil passage 41, a number of pump ports, a, a --- for permitting the cylinder bores 8, 8 --- to communicate with the adjacent first valve bores 42, 42 ---, a number of motor ports b, b --- for permitting the cylinder bores 18, 18 --- to communicate with the adjacent second valve bores 43, 43 ---. The inner oil passage 40 is defined between opposed peripheral surfaces of the cylinder block B and the output shaft 25, while the outer oil passage 41 is defined between opposed peripheral surfaces of the cylinder block B and a sleeve 44 fitted over and welded to the outer periphery of the cylinder block B. It is noted that the inner and outer oil passages 40 and 41 correspond respectively to lower and higher pressure oil passages of the present invention.

First and second distributor valves 45, 45 --- and 46, 46 --- are slidably fitted in the first and second valve bores 42, 42 --- and 43, 43 ---, respectively.

Figure 8:
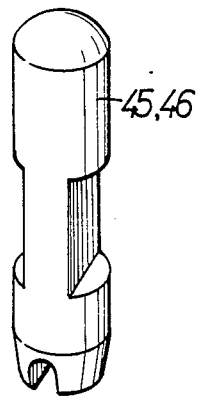

Each of the first distributor valves 45 is formed into a spool type as shown in FIG. 8, so that at its radially outer position in the first valve bore 42 in FIG. 3, it permits the corresponding pump port a to communicate with the outer oil passage 41, while simultaneously cutting off the communication of that port with the inner oil passage 40, thereby putting the corresponding cylinder bore 8 into communication with only the outer oil passage 41. At its radially inner position in the first valve bore 42, the first distributor valve 45 permits the corresponding pump port a to communicate with the inner oil passage 40, while at the same time cutting off the communication of that port with the outer oil passage 41, thereby bringing the corresponding cylinder bore 8 into communication with only inner oil passage 40. At its central position in the first valve bore 42, the first distributor valve 45 cuts off the communication of pump port a with both of the oil passages 40 and 41.

To provide the above mention to each distributor valve 45, a first eccentric wheel 47 surrounds the group of the first distributor valves 45, 45 --- and engages their outer ends, and a follower wheel 47' is disposed inside the group of the first distributor valves 45, 45 --- in a concentrical relation to the eccentric wheel 47 and engages grooves 45a, 45a at inner ends of the first distributor valves. This engagement inhibits the rotation of the individual first distributor valves 45. The follower wheel 47' is formed from a steel wire and disposed to resiliently urge the first distributor valves 45, 45 --- toward engagement with the first eccentric wheel 47. It is noted that a single cut may be provided in the follower wheel 47' to absorb a production error in diameter.

The first eccentric wheel 47 is rotatably supported through ball bearing 48 on a first control ring 51 connected to the input member 5 and is normally disposed in a first eccentric position e eccentrically displaced by a given distance $\epsilon 1$ from the center of the output shaft 25 along the phantom trunnion axis 01 of the pump swash plate 20. Thus, if relative rotation occurs between the input member 5 and the pump cylinder 7, each first distributor valve 45 reciprocates within the valve bore thereof between the aforesaid outer and inner positions for a stroke of a distance two times the eccentric amount $\epsilon 1$ of the first eccentric wheel 47.

Figure 5:
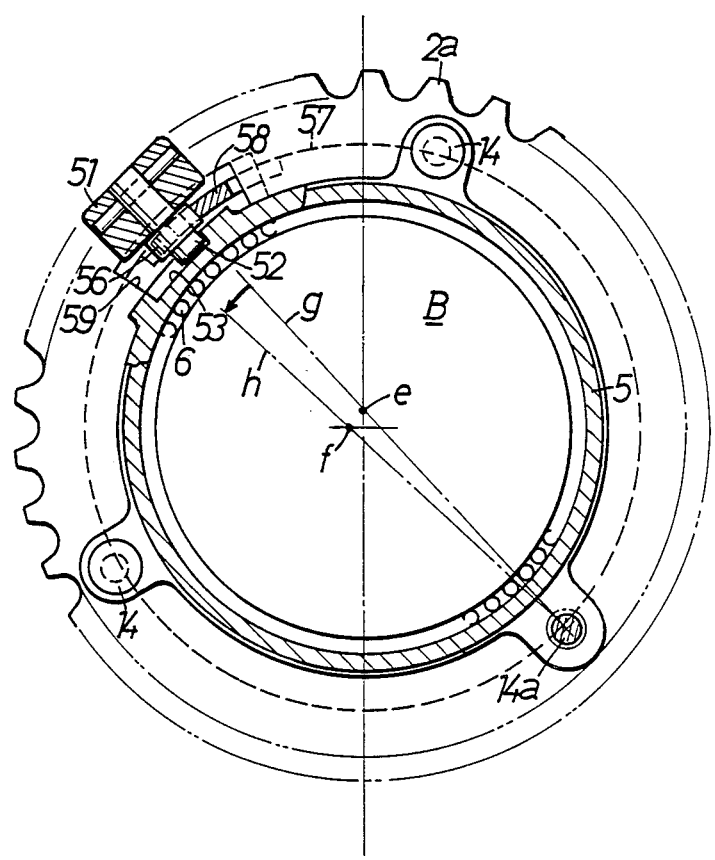
Figure 6:
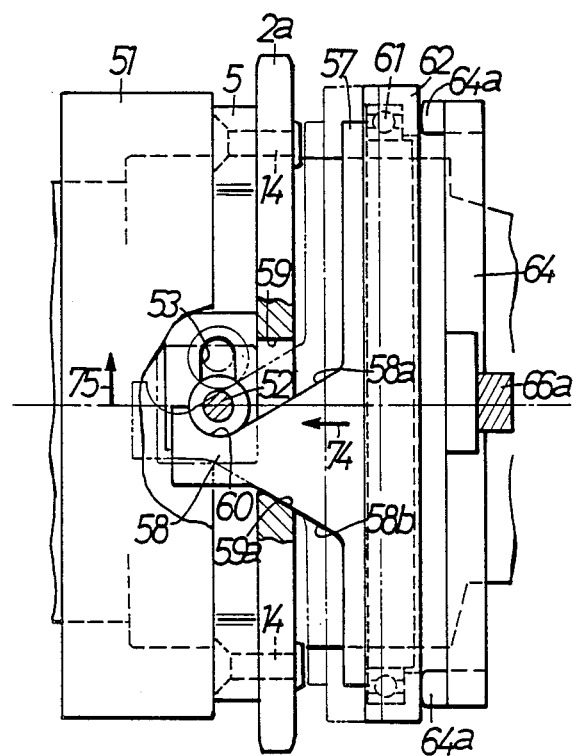

Referring to FIGS. 1 to 3, the first control ring 51 is swingably connected to the input member 5 through a pivot 14a formed by extension of one end of one of rivets 14 . . connecting the sprocket 2a to the input member 5. Therefore, the first control ring 51 is swingable about the pivot 14a between a clutch-on position g and a clutch-off position h in FIG. 3, and in the clutch-on position g, it controls the first eccentric wheel 47 to the first eccentric position e eccentrically displaced by the distance $\epsilon 1$ from the center of the output shaft 25 along the phantom trunnion axis 01. In the clutch-off position h, the first control ring 51 controls the first eccentric wheel 47 to a second eccentric position f eccentrically displaced by the distance $\epsilon 1$ from the center of the output shaft 25 along a perpendicular L of the trunnion axis 01. To regulate such range of swinging movement of the first control ring 51, a guide pin 52 secured to the control ring 51 to project from an inner peripheral surface thereof is slidably engaged in a guide groove provided in an outer periphery of the input member 5 and extending circumferentially, as shown in FIGS. 5 and 6. A leaf spring 54 is interposed between the first control ring 51 and the input member 5 to bias the first control ring 51 toward the clutch-on position g and is secured at its central portion to the first control ring 51 by a rivet 55.

A roller 56 is attached to the guide pin 52, and a push arm 58 provided on one side of an operating ring 57 to project therefrom is engaged with the roller 56. The operating ring 57 is slidably and rotatably fitted over the outer peripheral surface of the input member 5 on the side opposite to the first control ring 51 to sandwich the sprocket 2a therebetween, as shown in FIG. 2, with the push arm 58 being passed through a through hole 59 perforated in the sprocket 2a.

The push arm 58 has a recess 60 provided at its leading end and engaged by one side of the roller 56 so as to permit the first control ring 51 to swing toward the clutch-off position h (see FIG. 6). Also, the push arm 58 is angle-shaped to decrease in circumferential width toward its leading end, with one slant or inclined surface 58a forming such angle-shape being connected to the recess 60 and the other slant or inclined surface 58b being slidably engaged with a guide slant inclined surface 59a formed on the inner wall of the through hole 59.

Referring to FIG. 2, a release ring 62 is rotatably mounted on the outer periphery of the operating ring 57 through a release bearing 61 and has an outer end against which a ring-like clutch lever 64 abuts, which clutch lever is swingably pivoted on the crank case 4 to surround the input member 5.

Figure 7:
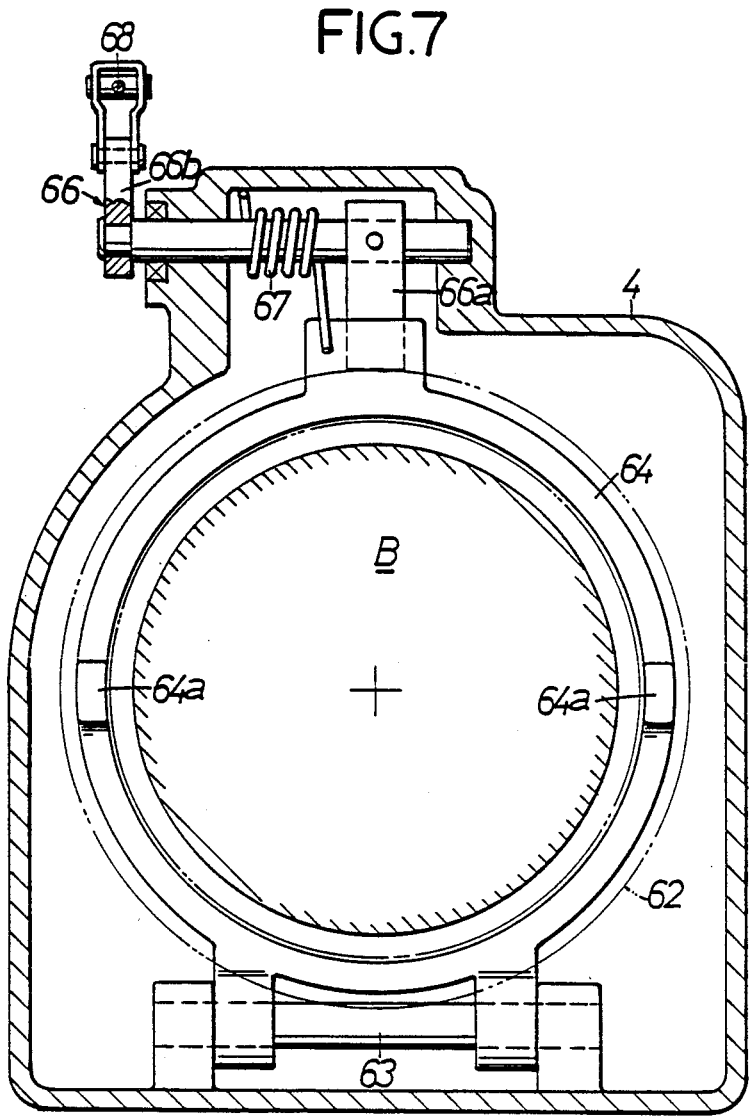

As shown in FIGS. 2 and 7, and inner lever 66a of a bell crank 66 pivoted at 65 to the crank case 4 is associated with a swinging end of the clutch lever 64 to urge the clutch lever 64 toward the release ring 62, and a return spring 67 is connected to the swinging end of the clutch lever 64 for biasing the clutch lever 64 in a direction opposite to the release ring 62.

The bell crank 66 includes the inner lever 66a disposed within the crank case 4 and an outer lever 66b disposed outside the crank case 4, and a clutch operating lever (not shown) which is operated by a driver is connected to the outer lever 66b through a wire 68.

Each of the second distributor valves 46 is formed into a spool type similar to that of the first distributor valve 45, as shown in FIG. 8. At a radially outer position in the second valve bore 43, the second distributor valve 46 permits the corresponding motor port b to communicate with the outer oil passage 41 while simultaneously cutting off the communication of the port with the inner oil passage 40, thereby bringing the corresponding cylinder bore 18 into communication with only the outer oil passage 41, whereas at a radially inner position, the second distributor valve 46 permits the corresponding motor port b to communicate with the inner oil passage 40 while at the same time cutting off the communication of the port with the outer oil passage 41, thereby bringing the corresponding cylinder bore 18 into communication with only the inner oil passage 40. Further, at a central position between the aforesaid both positions, the second distributor valve 46 brings the corresponding motor port b out of communication with either of the inner and outer oil passages 40 and 41.

To provide such motion to each second distributor valve 46, a second eccentric wheel 49 surrounds the group of the second distributor valves 46, 46 --- and engages their outer ends, and a follower wheel 49' is disposed inside the group of the second distributor valve 46, 46 ---in a concentric relation to the eccentric wheel 49 to engage grooves 46a, 46a --- at the inner ends of the second distributor valves, this engagement inhibiting the rotation of each second distributor valve 46. The follower wheel 49' is formed from a steel wire and disposed to resiliently urge the second distributor valves 46, 46 --- into engagement with the second eccentric wheel 49. It is to be understood that a single cut may be also provided in the follower wheel 49' as in the above-described follower wheel 47'.

Figure 9:
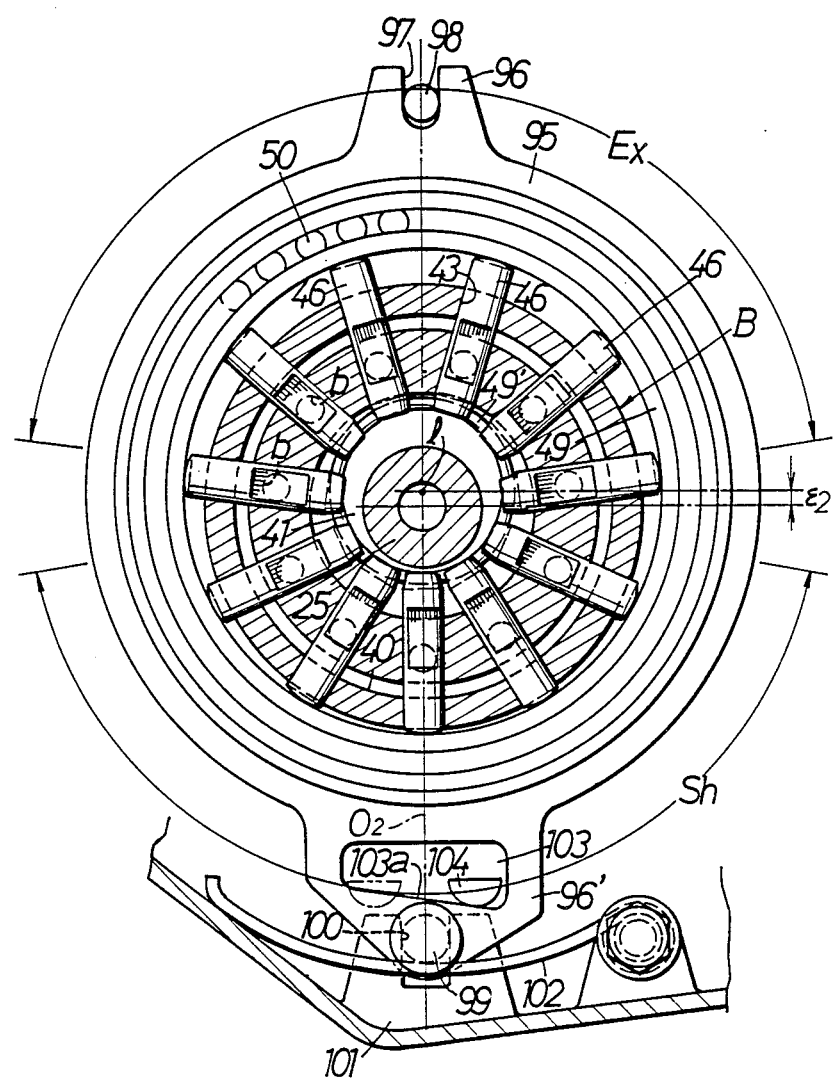

The second eccentric wheel 49 is controllable, as shown in FIG. 9, to an eccentric position l eccentrically displaced by a given distance $\epsilon 2$ from the center of the output shaft 25 along the tilting axis or trunnion axis 02 of the motor swash plate 20, and a position m concentric with the output shaft 25.

Thus, when the second eccentric wheel 49 assumes the eccentric position l, each second distributor valve 46, as the motor cylinder 17 is rotated, reciprocates within the valve bore 43 thereof between the aforesaid outer and inner positions for a stroke of a distance two times the eccentric amount $\epsilon 2$ of the second eccentric wheel 49, and when the second eccentric wheel 49 assumes the concentric position m, all the second distributor valves 46, 46 --- are arrested in the above-mention central position despite the rotation of the motor cylinder 17.

Referring to FIG. 2 again, a pair of upper and lower trunnion shafts 70 and 70' arranged on the trunnion axis 02 of the motor swash plate 20 are integrally provided respectively on opposite ends of the swash plate holder 22 and rotatably supported on opposite side walls of a cylindrial motor housing 72 integral with the crank case 4 respectively through roller bearings 71 and 71'. In other words, the trunnion axis 02 is defined by the trunnion shafts 70 and 70'. The motor housing 72 also supports the motor cylinder 17 for rotation through a needle bearing 73.

In the above arrangement, when the first control ring 51 assumes the clutch-on position g to control the first eccentric wheel 47 to the first eccentric position e, and on the other hand, when the second eccentric wheel 49 assumes the eccentric position l, the pump swash plate 10, in response to the input member 5 of the hydraulic pump P rotated by the first reduction gear 2, alternately provides intake or suction and discharge strokes to the pump plungers 9, 9 ---. A suction or intake stroke region S and a discharge stroke region D of the hydraulic pump P are shown in FIG. 3. The first distributor valve 45 located in the intake stroke region S is moved to the inner position in cooperation of the first eccentric wheel 47 with the follower wheel 47', while the first distributor valve 45 located in the discharge region D is moved to the outer position in cooperation of the first eccentric wheel 47 with the follower wheel 47'. Thus, each pump plunger 9 draws a working oil from the inner oil passage 40 into the cylinder bore 8 in the suction stroke and pump the working oil from the cylinder bore 8 into the outer oil passage 41 in the discharge stroke.

The high pressure working oil passed into the outer oil passage 41 is supplied into the motor port b located in an expansion stroke region Ex (see FIG. 9) of the hydraulic motor M through the second distributor valve 46 controlled to the outer position by the second eccentric wheel 49 and the follower wheel 49', while the working oil discharged through the motor port b located in a retraction stroke region Sh (see FIG. 9) is passed into the inner oil passage 40 through the second distributor valve 46 controlled to the inner position by the second eccentric wheel 49 and the follower wheel 49'.

During this operation, the cylinder block B is rotated by the sum of a reaction torque received by the pump cylinder 7 from the pump swash plate 10 through the pump plungers 9 which are in the discharge stroke and a reaction torque received by the motor cylinder 17 from the motor swash plate 20 through the motor plungers 19 which are in the expansion stroke. That rotational torque is transmitted from the output shaft 25 to the secondary reduction gear 3.

In this case, the shift ratio of the output shaft 25 to the input member 5 is given by the following equation:

$$\text{Shift ratio} = 1 + \frac{\text{Volume of the hydraulic motor } M}{\text{Volume of the hydraulic pump } P}$$

Accordingly, the shift ratio can be varied from 1 to a certain required value if the volume of the hydraulic motor M is changed from zero to a certain value.

Because the volume of the hydraulic motor M is determined by the stroke of the motor plungers 19, the shift ratio can be continuously controlled from 1 to a certain value by providing the tilting displacement of the motor swash plate 20 from the upright position to a certain inclined position.

During such operation, if the clutch lever 64 is swung toward the release ring 62 against the force of the return spring 67 through the wire 68 and the bell crank 66 by the operation of the clutch operating lever which is not shown, an urging force applied to the release ring 62 acts on the operating ring 57 through the release bearing 61 to slidably move the operating ring 57 in a left direction as indicated by an arrow 74 in FIG. 6, thereby forcing the push arm 58 deeply into the through hole 59 in the sprocket 2a. Thereupon, a large circumferential displacement 75 can be imparted to the roller 56, even with a slight axial displacement of the operating ring 57, by an urging action of the guide slant 59a of the through hole 59 on the slant 58b of the push arm 58 and by an urging action of the slant 58a of the push arm 58 on the roller 56, thereby causing the first control ring 51 to swing from the current clutch-on position g to the clutch-off position h against the force of the leaf spring 54.

Figure 3A:
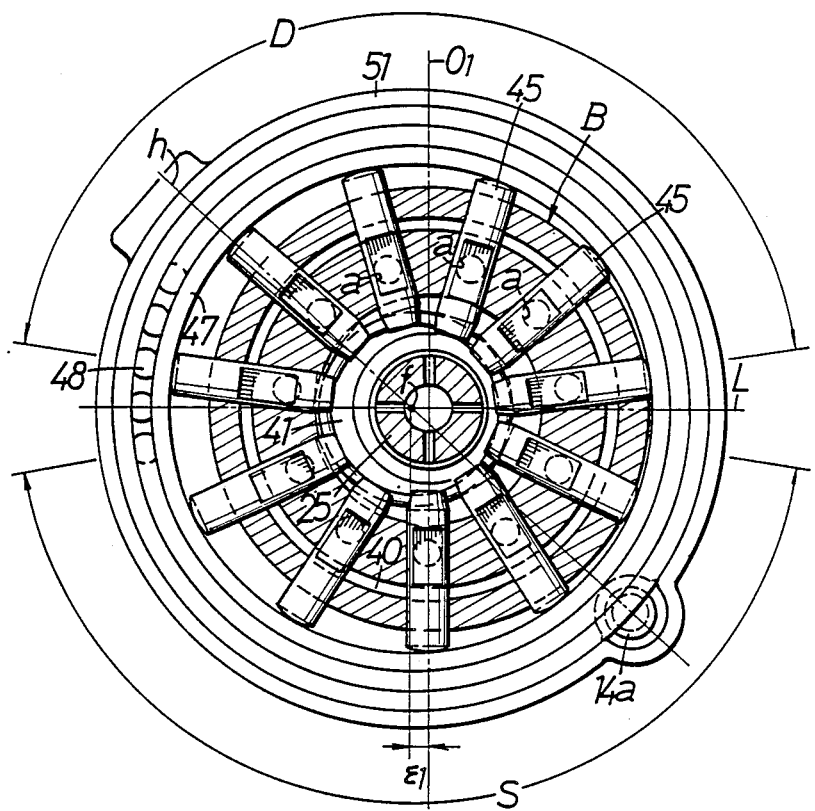
FIG. 3A is a view of explaining an operation, similar to FIG. 3.
Figure 4:
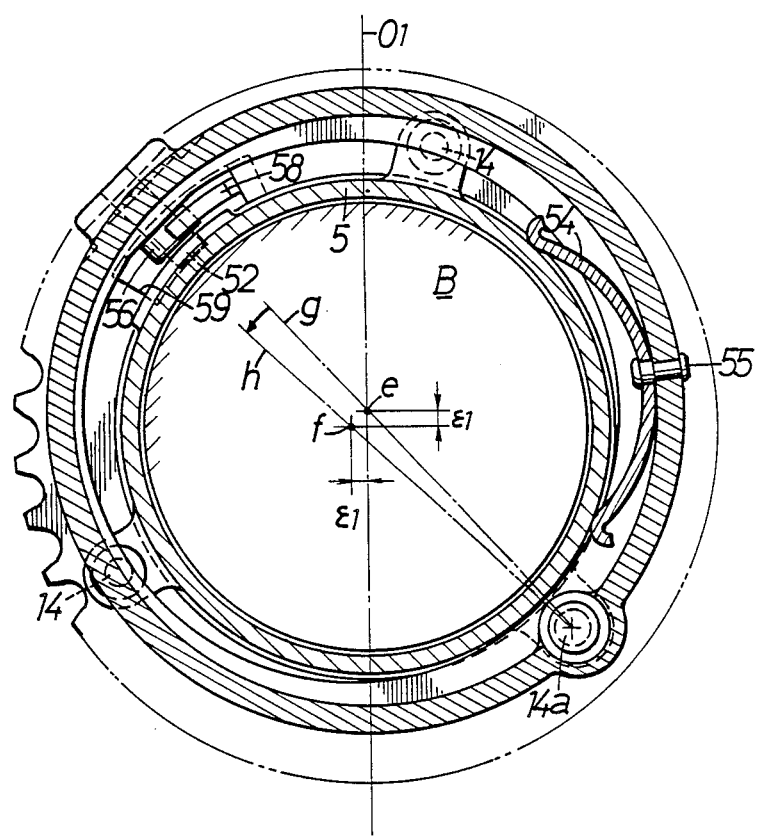

As a result, the first eccentric wheel 47 is shifted from the first eccentric position e to the second eccentric position f, and as shown in FIG. 3A, in the individual regions S and D of intake and discharge strokes of the hydraulic pump P, the second distributor valves 46, 46 . . . permit one half of the pump ports a . . . to communicate with the inner oil passage 40 and the other half to communicate with the outer oil passage 41, thereby bringing the hydraulic pump P into a short-circuited state, so that the high pressure working oil discharged through the pump ports a in the discharge stroke region D of the hydraulic pump P is immediately drawn into the pump ports a in the intake stroke region 5. This stops transferring of the working oil between the hydraulic pump P and the hydraulic motor M to provide a clutch-off state in which the transmitting of power from the hydraulic pump P to the hydraulic motor M is cut off.

During operation of the hydraulic pump P and the hydraulic motor M, the pump swash plate 10 receives a thrust load from the group of the pump plungers 9, 9 ---, while the motor swash plate 20 receives a thrust load from the group of the motor plungers 19, 19 ---, these thrust loads being in opposite directions to each other, but the thrust load received by the pump swash plate 10 is borne on the output shaft 25 through the thrust roller bearing 11, the input member 5, the thrust roller bearing 12, the support tube 13 and the nut 30, whilst the thrust load received by the motor swash plate 20 is similarly borne on the output shaft 25 through the thrust roller bearing 21, the swash plate holder 22, the swash plate anchor 23, the thrust roller bearing 32, the support tube 33, the sprocket 3a and the nut 34. Therefore, these loads merely cause the output shaft 25 to produce a tensile stress, and will not act on the crank case 4 supporting the output shaft 25 at all.

Figure 10:
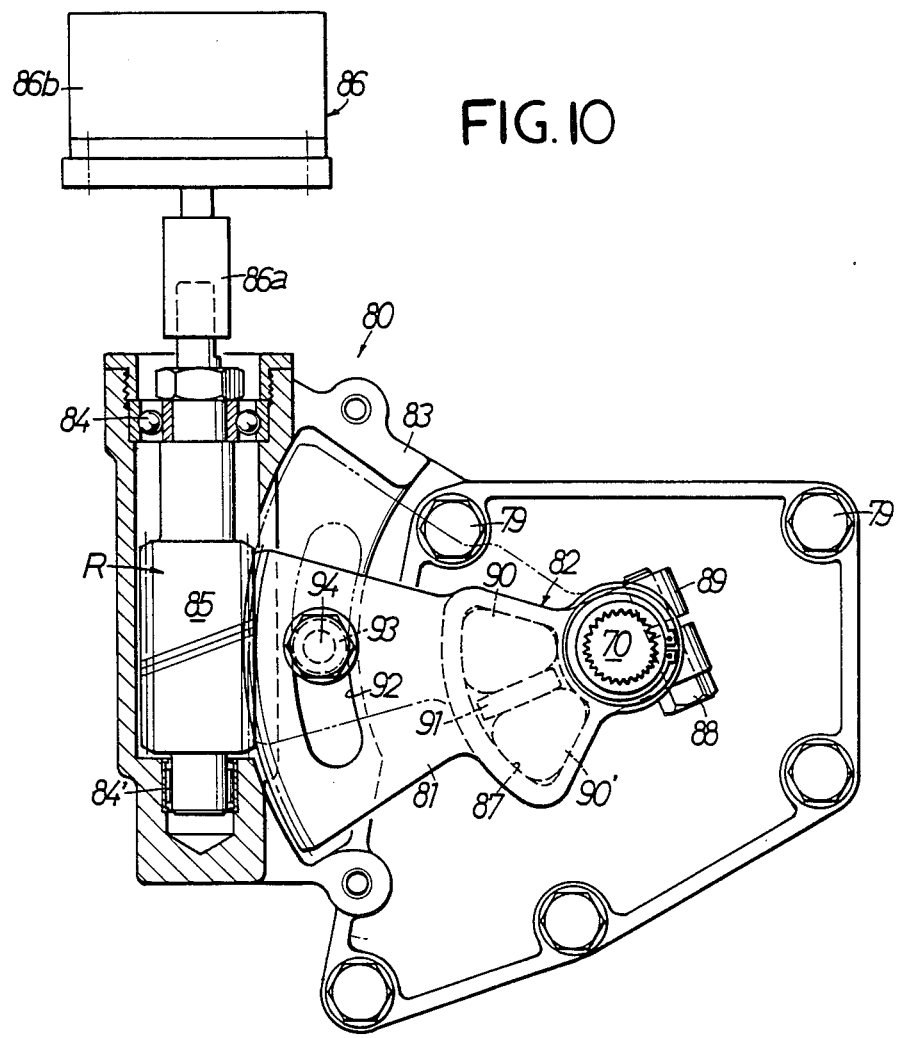
Figure 11:
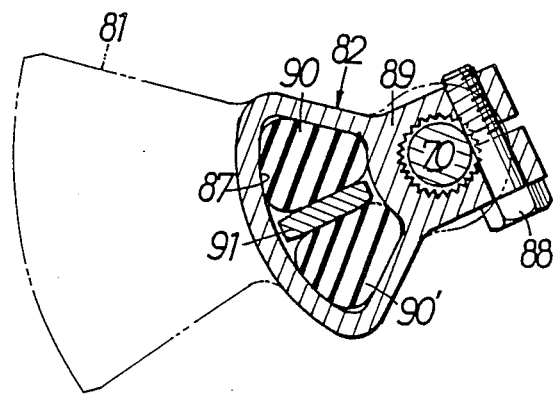

Referring to FIGS. 2, 10 and 11, a shift control device 80 is connected to the trunnion shaft 70 for controlling the angle of the swash plate 20 through the trunnion shaft 70. The shift control device 80 comprises a sector gear 81 rotatably carried on the trunnion shaft 70, a damper 82 resiliently connecting the sector gear 81 to the trunnion shaft 70, a worm gear 85 carried on a bracket plate 83 secured to the crank case 4 by a bolt 79 and meshed with the sector gear 81, and a reversible DC electric motor 86 having a drive shaft 86a connected to the worm gear 85, a stator 86b of the electric motor 86 being fixedly mounted in place on the crank case 4.

In the above case, the sector gear 81 and the worm gear 85 constitutes a reduction device R which is capable of transmitting the rotation of the drive shaft 86a to the trunnion shaft 70 at a reduced speed and which is brought into a locked state upon receipt of a reverse load from the trunnion shaft 70.

The damper 82 comprises a damper body 89 secured to the trunnion shaft 70 by a bolt 88 and having a fan-shaped buffer chamber 87 of which center corresponds to the center of the trunnion shaft 70, and a pair of rubber buffer members 90 and 90' filled in the buffer chamber 87, with a transmitting piece 91 mounted projecting from one side surface of the sector gear 81 being inserted between both of the buffer members 90 and 90'.

If the electric motor 86 is rotated normally or reversely, the rotation can be transmitted through the worm gear 85 to the sector gear 81 at a reduced speed and further through the transmitting piece 91, the buffer member 90 or 90' and the damper body 89 to the trunnion shaft 70 to rotate the trunnion shaft 70 in a direction to stand up or tilt down the motor swash plate 20.

In this case, if pulsation is produced in the thrust load applied from the motor plungers to the motor swash plate 20, then such pulsation is absorbed by a resilient deformation of the buffer member 90, 90', thereby making it possible to reduce burden on the worm gear 85 and the sector gear 81.

When the electric motor 86 is stopped to maintain the motor swash plate 20 at any angle, the sector gear 81 and the worm gear 85 each assume a locked state and will not permit the rotation of the trunnion shaft 70 and hence, the motor swash plate 20 is reliably maintained in the current position, because the worm gear 85 cannot be driven from the sector gear 81 even if the motor swash plate 20 receives a moment acting in the standing or tilting-down direction from the motor plungers 19, 19 . . . and such moment is transmitted through the trunnion shaft 70 to the sector gear 81.

To regulate upright and tilted-down positions of the motor swash plate 20 provided by the electric motor 85, an arcuate regulating groove 92 is concentrically provided in the sector gear 86, and a regulating collar 93 slidably engaging the regulating groove 92 is secured to the bracket plate 83 by a bolt 94.

Referring to FIGS. 2 and 9, the second eccentric wheel 49 is rotatably carried on a second control ring 95 through bearing 50. The second control ring 95 includes a pair of ears 96 and 96' at its opposite sides along the trunnion axis 02. A U-shaped guide groove 97 extending in the trunnion axis 02 is provided in one 96 of the ears, and a guide pin 98 slidably inserted into the guide groove 97 is fixedly mounted on the crank case 4. A second guide pin 99 is also fixedly mounted on the other ear 96', and a support portion 101 having a U-shaped guide groove 100 engaged by the guide pin 99 and extending in the trunnion axis 02 is mounted on the inner wall of the crank case 4. In this manner, the second control ring 95 is displaceable in the direction of the trunnion axis 02, so that this displacement enables the second eccentric wheel 49 to be moved to the eccentric position 1 and the concentric position m.

A return spring 102 in the form of a leaf spring is pressed on the guide pin 99 integral with the second control ring 95 to resiliently bias the second control ring 95 toward the eccentric position 1 of the second eccentric wheel 49.

Further, the ear 96' has a cam hole 103 provided therein, in which a control lever 104 secured to the trunnion shaft 70' is inserted. The cam hole 103 has an inner surface, closer to the return spring 102, formed as a slant or inclined surface 103a engaging the control lever 104, so that if may be urged against the control lever 104 interlockingly with the standing motion of the motor swash plate 20. This urging causes the second control ring 95 to displace against the force of the return spring 102, thereby displacing the second eccentric wheel 49 from the eccentric position 1 toward concentric position m and thus, in the upright state of the motor swash plate 20, controlling the second eccentric wheel 49 to the concentric position m.

Figure 9A:
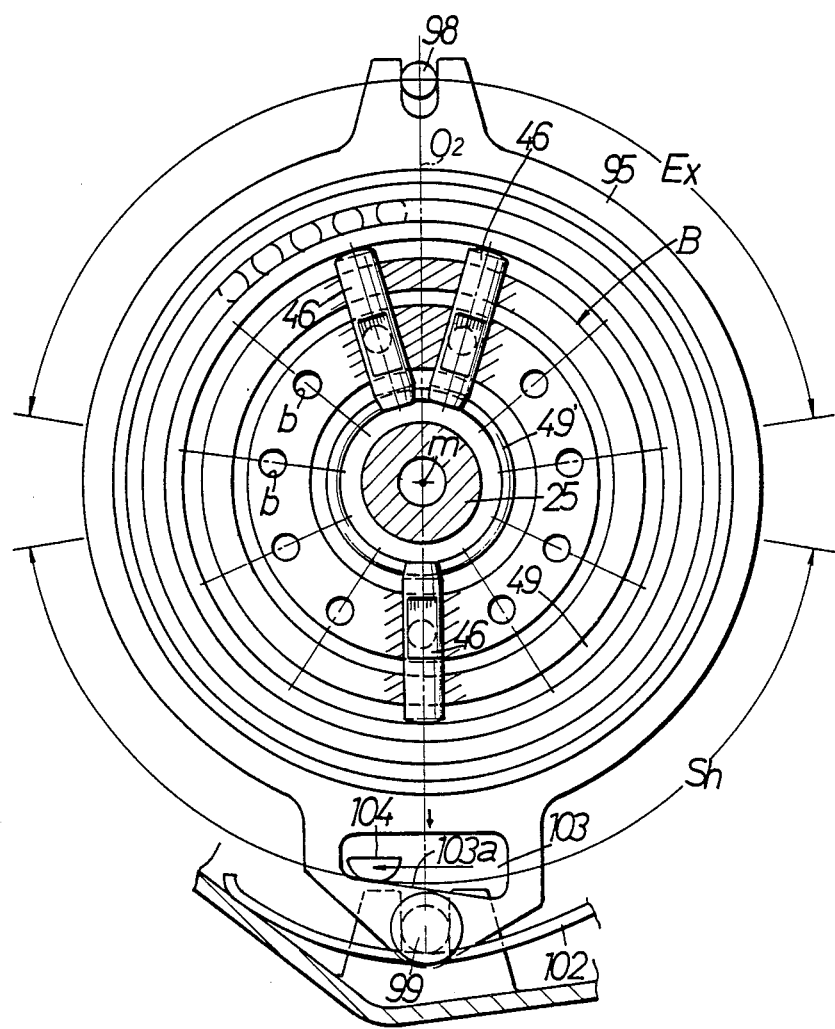
FIG. 9A is a view of explaining an operation, similar to FIG. 9.

When the second eccentric wheel 49 has reached the eccentric position m, all the second distributor valves 46, 46 --- assume their closed states as shown in FIG. 9A, so that both of the higher and lower pressure oil passages 41 and 40 are cut off their communication with the hydraulic motor M. As a result, the volume of a low pressure circuit communicating with the hydraulic pump P decreases by an amount corresponding to the volume on the side of the motor M and hence, even if bubbles are somewhat contained in the working oil, the amount of working oil compressed by the hydraulic pump P is extremely small so that the relative rotation between the input member 5 and the output shaft 25 can be suppressed to a very low extent, and thus, the transmitting efficiency can be enhanced when the shift ratio is set to be 1.

In this case, the displacement of the second eccentric wheel 49 to the concentric position h, in the illustrated embodiment, is steplessly effected interlockingly with the standing movement of the motor swash plate 20 by the action of the slant or inclined surface 103a of the cam hole 103 and hence, each of the second distributor valves 46, 46 --- also steplessly performs its own closing motion and ultimately attains the closed state. Accordingly, a shifting shock can be prevented from generating when the valves are closed, because the increase in the transmitting efficiency gradually begins prior to the attainment of the closed state. When a shifting shock is at such a low level as acceptable, the closing of the second distributor valves 46, 46 --- may be rapidly effected when the motor swash plate 20 comes to an upright position.

Referring again to FIG. 1, the output shaft 25 has a blind oil passage 110 made at a central portion thereof, and an opened end of the oil passage 110 is in communication with an oil pan (not shown) provided at the bottom of the crank case 4 through a supplement pump 111 which is driven from the input member 5. Therefore, during rotation of the input member 5, the oil in the oil pan is constantly supplied into the oil passage 110 by the supplement pump 111.

The oil passage 110 is in communication with the inner oil passage 40 through a radial supplement hole 112 made in the output shaft 25. A check valve 113, which prevents the reverse flow of the oil toward the supplement pump 111, is interposed in the oil passage 110.

Thus, if there is a leakage of the working oil from the hydraulic closed circuit between the hydraulic pump P and the hydraulic motor M during a normal load operation, the working oil is supplemented from the oil passage 110 through the supplement hole 112 into the inner oil passage 40.

During a reverse load operation, i.e., during engine braking, the hydraulic motor M performs a pump action, while the hydraulic pump P performs a motor action, so that the outer oil passage 41 is at a lower pressure and the inner oil passage 40 is at a higher pressure. Here the working oil is urged to reversely flow from the inner oil passage 40 into the oil passage 110, but such reverse flow is blocked by the check valve 113. Therefore, the reverse load can be reliably transmitted from the hydraulic motor M to the hydraulic pump P to provide a good engine braking effect.

It is noted that the reference numerals 114 and 115 in FIG. 1 each denotes an orifice perforated in the output shaft 25 to supply a lubricating oil from the oil passage 110 to each of the abutments between the plungers 9 and 19 and the swash plates 10 and 20.

FIGS. 12 to 22 illustrate a second embodiment wherein a shift control device 80 is mainly different from that in the first embodiment in that it newly has a shift assisting device 80s to assist an electric motor 86 thereof.

Figure 16:
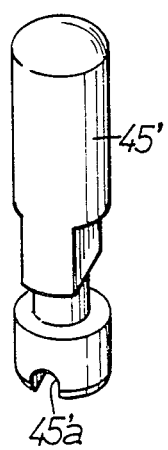
Figure 18:
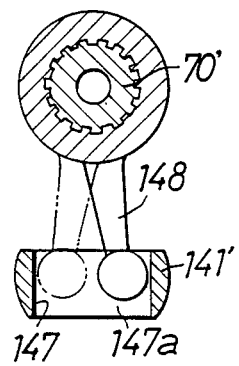

In addition, first distributor valves 45', 45' . . . for controlling the communication of the pump ports a in the hydraulic pump P with the outer oil passage 41 and the inner oil passage 40 are formed into a spool type different from that in the previous embodiment, as shown in FIG. 16.

Figure 17:
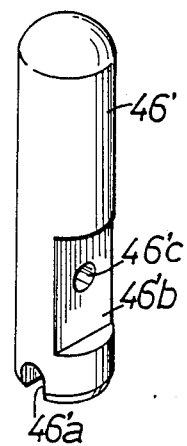

On the other hand, second distributor valves 46', 46' . . . for controlling the communication of the motor ports b in the hydraulic motor M with the outer oil passage 41 and the inner oil passage 40 are also formed into a spool type different from that in the previous embodiment, as shown in FIG. 17 and each has a notch 46'b made by cutting one side of its outer peripheral surface and a transverse hole 46'c for permitting the interior of the notch 46'b to normally communicate with the motor port b. The connection and disconnection between the motor port b and the inner and outer oil passages 40 and 41 by the valve 46' depend upon whether the notch 46'b faces the inner oil passage 40 or the outer oil passage 41 or is located within the partition wall between the both oil passages 40 and 41.

Figure 14:
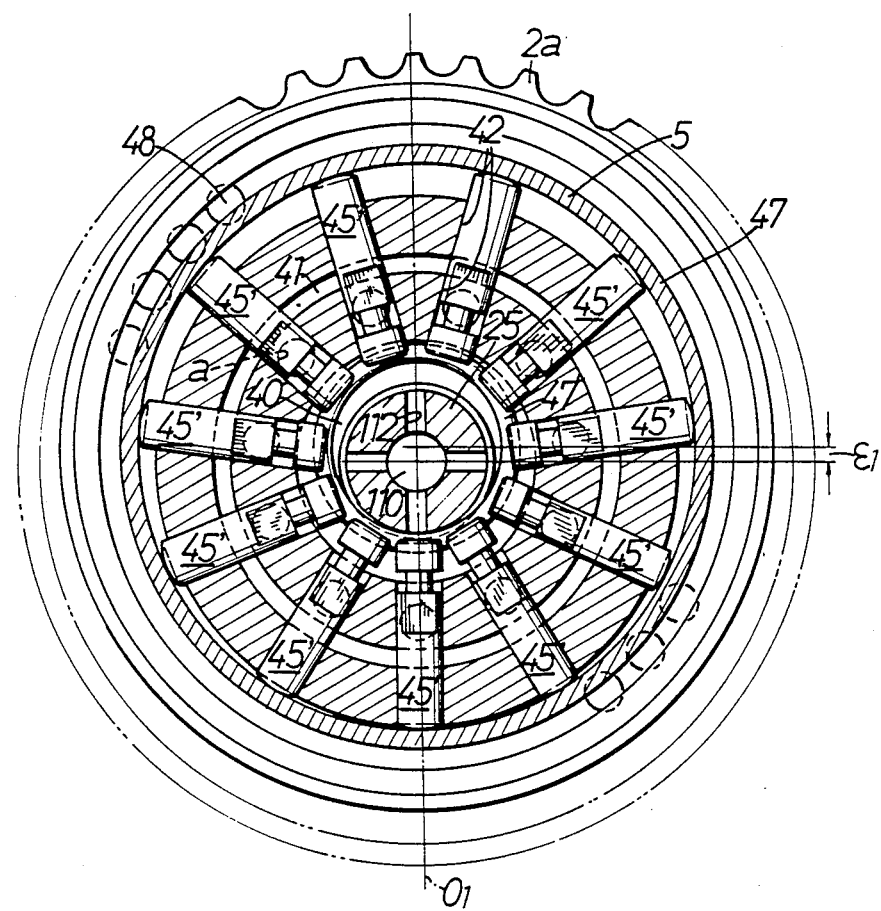

Unlike the previous embodiment, the first eccentric wheel 47 engaging the outer ends of the first distributor valves 45', 45' . . . to permit them to reciprocate within the individual holes 42, in this embodiment, is maintained at a position eccentrically displaced by a given distance $\epsilon 1$ from the center of rotation of the output shaft 25 along the phantom trunnion axis 01 of the pump swash plate 20, as shown in FIG. 14, and means is not provided for changing this eccentric position.

The second eccentric wheel 49 engaging the outer ends of the second distributor valves 46', 46' . . . is rotatably supported on an operating ring 140 through bearing 50. Like the second control ring 95 in the previous embodiment, the operating ring 140 includes a pair of ears 141 and 141' at its opposite sides in the direction of the trunnion axis 02, as clearly shown in FIG. 15. One 141 of the ears has a guide groove 142 into which a guide pin 143 secured to the crank case 142 is inserted. A guide shaft 144 is continuously formed with a leading end of the other ear 141', and a guide hole 145, in which the guide shaft 144 slides along the trunnion axis 02, is perforated in the crank case 4. Thus, the operating ring 140 is displaceable in the direction of the trunnion axis 02, so that this displacement enables the second eccentric wheel 49 to be moved to the eccentric position 1 and the concentric position m.

A return spring 146 is mounted in compression in the guide hole 145 for resiliently bias the operating ring 140 toward the eccentric position 1 of the second eccentric wheel 49.

Figure 15:
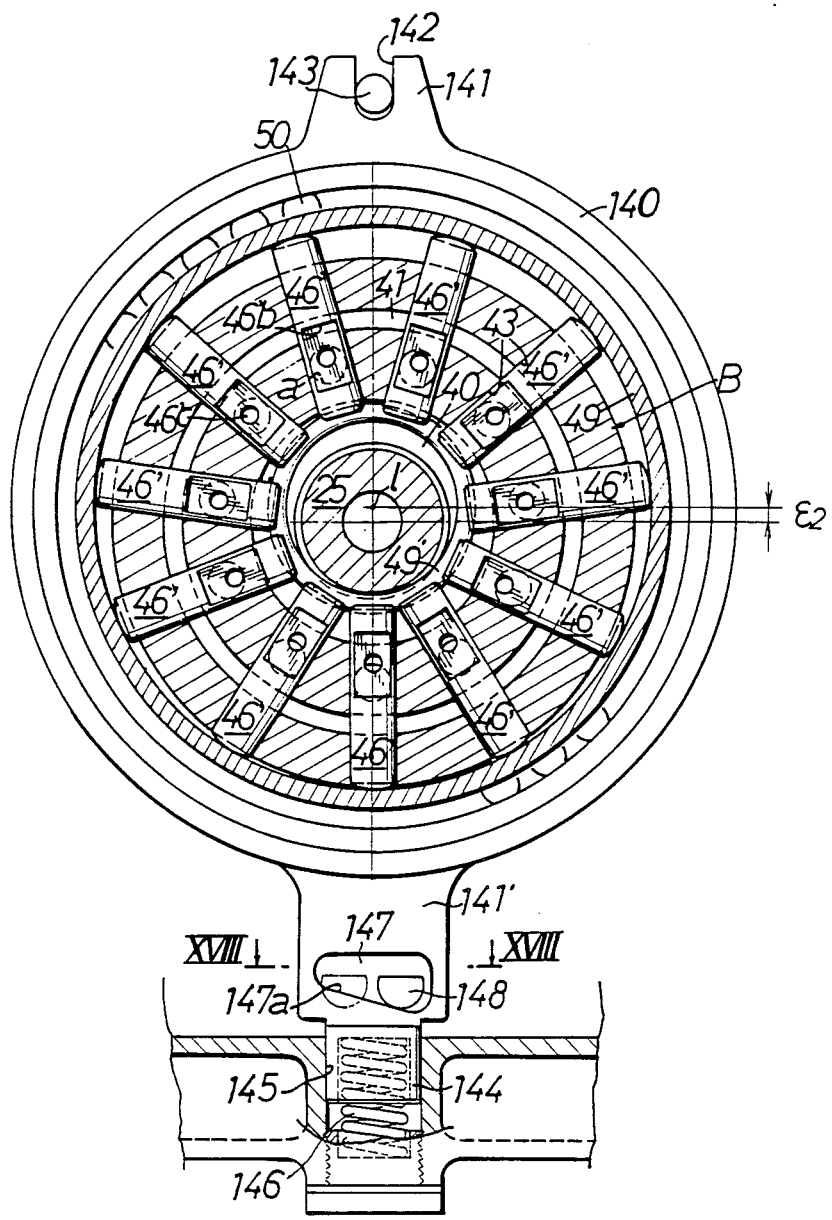
Figure 15A:
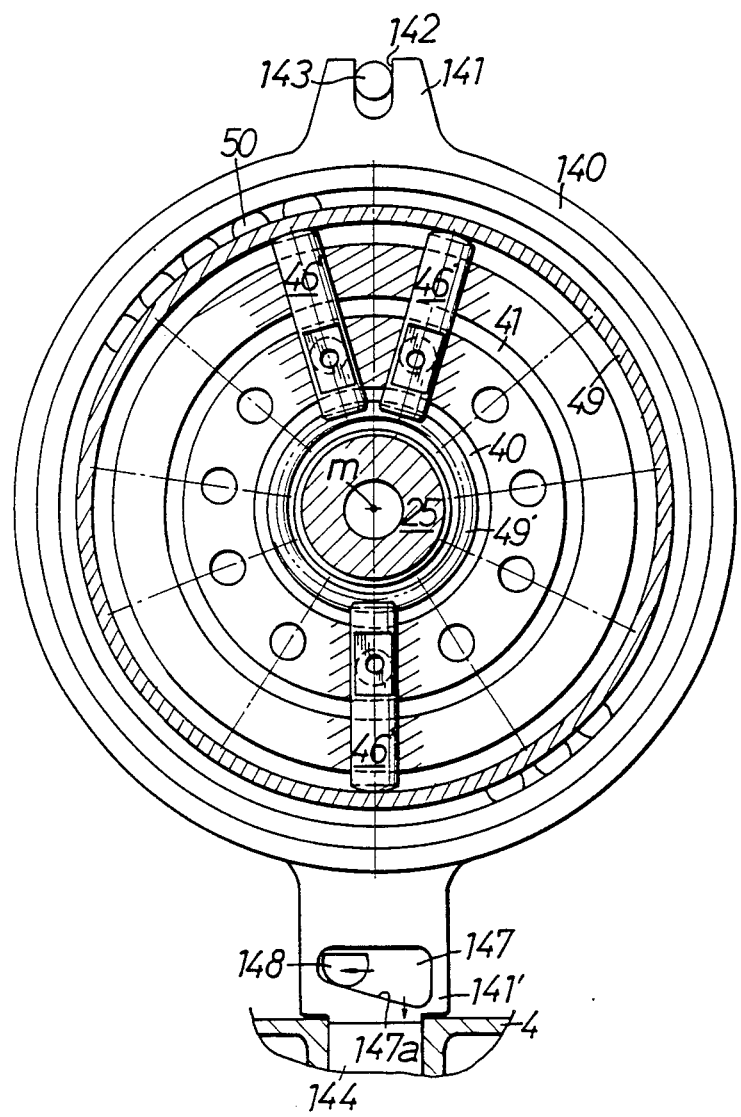
FIG. 15A is a view of explaining an operation, similar to FIG. 15.
Figure 19:
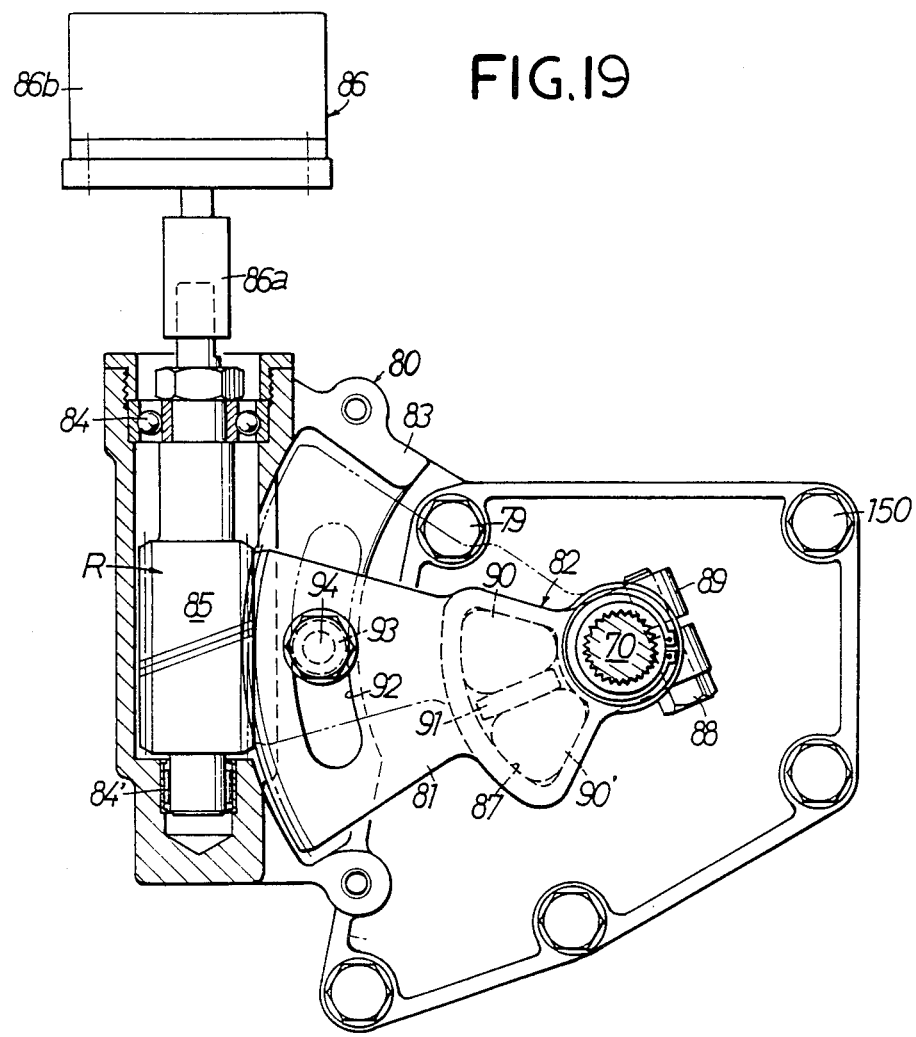

Further, a cam hole 147 is provided in the ear 141', and a control lever 148 secured to a trunnion shaft 70' is inserted into the cam hole 147. An inner surface of the cam hole 147 closer to the guide shaft 144 is a slant or inclined surface 147a engaging the control lever 148 and adapted to be urged against the control lever 148 interlockingly with standing motion of the motor swash plate 20. Like the second control ring 95 in the first embodiment, this urging causes the operating ring 140 to displace against the force of the return spring 146, thereby providing the displacement of the second eccentric wheel 49 from the eccentric position l in FIG. 15 to the concentric position m in FIG. 15A and thus, in the upright state of the motor swash plate 20, controlling the second eccentric wheel 49 to the concentric position m.

Further, in this embodiment, an oil feed pipe 114 supported on the side wall of the crank case 4 is inserted into an opened end of an oil passage 110 provided in the output shaft 25. The oil feed pipe 114 communicates with the interior of an oil pan 119 at the bottom of the crank case 4 through an oil passage 115 defined in the side wall of the crank case 4, a filter 116 mounted on the same side wall, a supplement pump 117 and a strainer 118. The supplement pump 117 is driven through gears 170 and 171 from the input member 5. Accordingly, during rotation of the input member 5, oil in the oil pan 119 is constantly supplied into the oil passage 110 by the operation of the supplement pump 117.

A pair of upper and lower trunnion shafts 70 and 70' mounted side by side on the trunnion axis 02 of the motor swash plate 20 to project from the opposite ends of the swash plate holder 22 are rotatably supported on a cup-shaped swash plate anchor 23 through a needle bearing 177 and a roller bearing 177', respectively. The swash plate anchor 23' is carried on the outer periphery of the motor cylinder 17 through a needle bearing 73 and connected to the crank case 4 through a single or a pair of positioning pin or pins 179 against turning movement about the output shaft 25.

Description will now be made of the shift assisting device 80s incorporated in the shift drive device 80 for controlling the inclined angle of the motor swash plate 20 to assist the electric motor 86 thereof.

Figure 20:
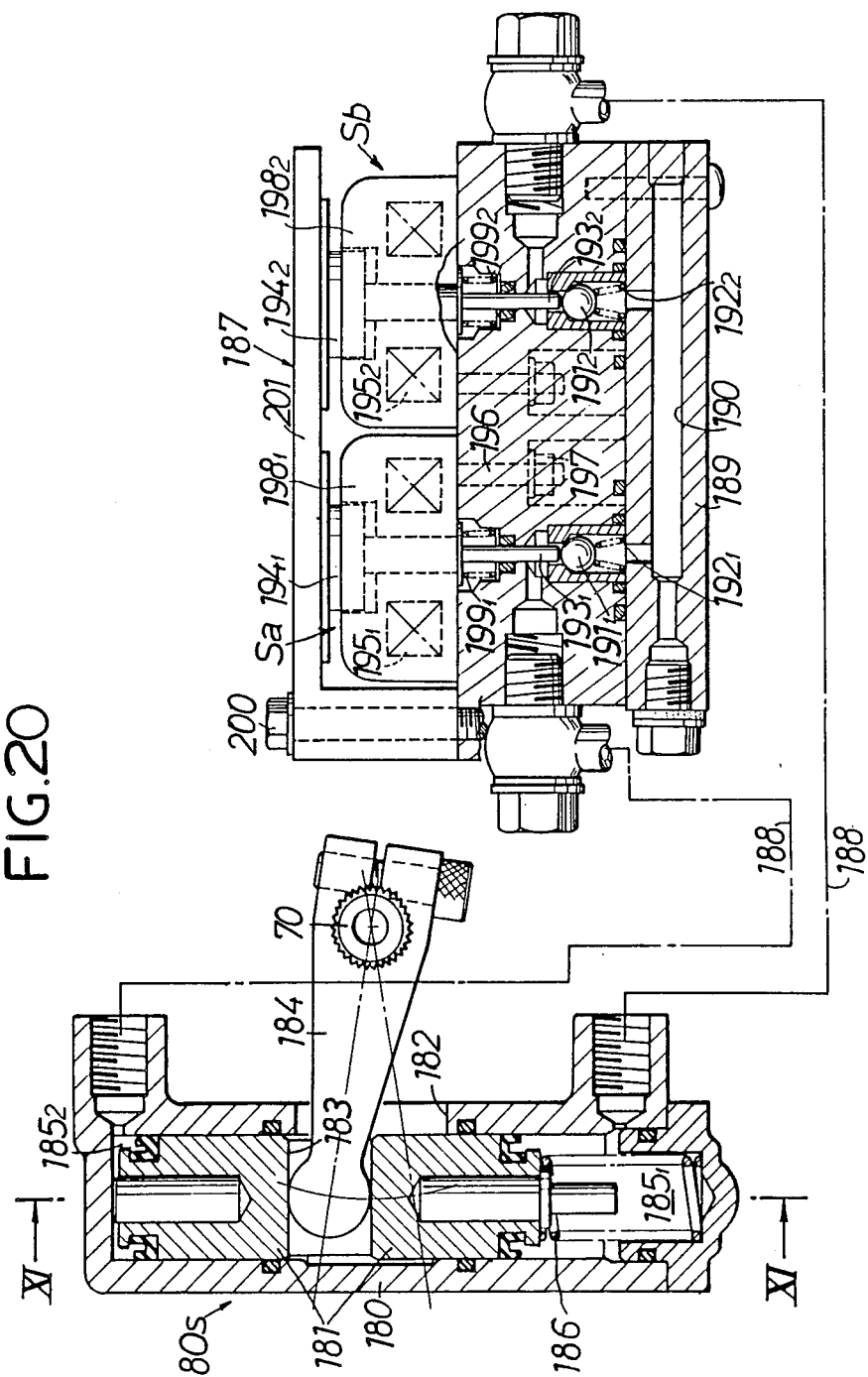

The shift assisting device 80s, as shown in FIG. 20, comprises a cylinder 180 secured in place to the crank case 4 and a piston 181 slidably received in the cylinder 180. A window 182 is provided in a side wall of the cylinder 180, and a connecting hole 183 is made in a central portion of the piston 181 and transversely passed therethrough to face the window 182. An operating lever 184 secured to the trunnion shaft 70 is passed through the window 182 to engage the connecting hole 183 and adapted to cause the piston to slide in response to the rotation of the trunnion shaft 70.

A maximum inclined position and upright position of the motor swash plate 20 are determined by upper and lower limits of movement of the piston 181 in FIG. 20. A first oil chamber $185_1$ is defined between the piston 181 and a lower end wall of the cylinder 180, and a second oil chamber $185_2$ is between the piston 181 and an upper end wall of the cylinder 180, with a return spring 186 being mounted in compression in the first oil chamber $185_1$ for biasing the piston 181 toward the second oil chamber $185_2$.

The first and second oil chambers $185_1$ and $185_2$ are interconnected through a hydraulic conduit 188 having a control valve 187 interposed on the way thereof and are filled with a working oil.

The control valve 187 is constituted of a valve case 189 disposed in a proper place on a vehicle steering system and interposed on the way of the hydraulic conduit 188, and first and second check valves $191_1$ and $191_2$ interposed in series in an oil passage within the valve case 189. The first and second check valves $191_1$ and $191_2$ are arranged to have flow directions opposite to each other and are constantly biased in their closing direction by valve springs $192_1$ and $192_2$, respectively.

Operating rods $193_1$ and $193_2$ of first and second solenoid actuators Sa and Sb are associated respectively with the first and second check valves $191_1$ and $191_2$ so as to forcibly open them in timely manner. The first and second solenoid actuators Sa and Sb are each constituted of a movable iron core $194_1$, $195_2$ integrally provided at its leading end with the operating rod $193_1$, $193_2$, a solenoid $195_1$, $195_2$ surrounding the movable iron core $194_1$, $194_2$, an actuator body $198_1$, $198_2$ secured to the valve case 189 by a bolt 196 and a nut 197 to retain the solenoid $195_1$, $195_2$, a return spring $199_1$, $199_2$ for biasing the movable iron core $194_1$, $194_2$ toward an upper inoperative position, and a common stop plate 201 secured to the valve case 189 by a bolt 200 to define the inoperative position of the movable iron core $194_1$, $194_2$.

In the first and second solenoid actuators Sa and Sb, when the solenoids $195_1$ and $195_2$ are deenergized, the movable iron cores $194_1$ and $194_2$ are maintained in their inoperative positions by forces of the return springs $199_1$ and $199_2$, so that the operating rods $193_1$ and $193_2$ are spaced apart from the first and second check valves $191_1$ and $191_2$, enabling the first and second check valves $191_1$ and $191_2$ to keep their closed states. If the solenoids $195_1$ and $195_2$ are energized, actions of their magnetic forces cause the movable iron cores $194_1$ and $194_2$ to move down against forces of the return springs $199_1$ and $199_2$, so that the first and second check valves $191_1$ and $191_2$ can be forcibly opened. The solenoid $195_1$ of the first solenoid actuator Sa is excited during normal rotation of the electric motor 86, while the solenoid $195_2$ of the second solenoid actuator Sb is excited during reverse rotation of the electric motor 86. Now, because the number of the motor plungers 19, 19 . . . is an odd number, a thrust load exerted on the motor swash plate 20 by the motor plungers 19, 19 . . . during rotation of the motor cylinder 17 alternately varies in strength on one side and the other side with respect to a boader provided by the trunnion axis 02 of the motor swash plate 20, and a vibratory tilting torque acts on the motor swash plate 20. This vibratory tilting torque acts as an urging force on the piston 181 alternately upwardly and downwardly in FIG. 20.

Thereupon, if the solenoids $195_1$ and $195_2$ of the two solenoid actuators Sa and Sb are deenergized when the electric motor 86 is in inoperative state, both the check valves $191_1$ and $191_2$ in the closed states cooperate to completely block the passing of the oil within the valve case 189, so that the piston 181 can be hydraulically locked to retain the operating lever 184 at its current position, thus holding the motor swash plate 20 in the upright position or certain inclined position. As a result, it is possible to block transferring of a reverse load from the motor swash plate 20 to the reduction device R of the shift control device 80 and the electric motor 86.

If only the solenoid $195_1$ of the first solenoid actuator Sa is energized during rotation of the electric motor 86, the first check valve $191_1$ is brought into the opened state and hence, the oil flow from the first oil chamber $185_1$ to the second oil chamber $185_2$ is permitted by the second check valve $191_2$, but the reverse oil flow is blocked. Consequently, the downward movement (FIG. 20) of the piston 181 and thus only the standing motion of the motor swash plate 20 is permitted and therefore, only a moment acting in the direction of standing of the motor swash plate 20, of the vibratory tilting moments of the motor swash plate 20, assists the normal rotational torque of the electric motor 86. Thus the normal rotation of the electric motor 86 moves the motor swash plate 20 in the standing direction lightly.

On the contrary, if only the solenoid $195_2$ of the second solenoid actuator Sb is energized during reverse rotation of the electric motor 86, the second check valve $191_2$ is brought into the opened state and hence, the oil flow from the second oil chamber $185_2$ to the first oil chamber $185_1$ is permitted by the first check valve $191_1$, but its reverse oil flow is blocked. Consequently, the downward movement (FIG. 20) of the piston 181 and thus only the tilting down of the motor swash plate 20 is permitted and therefore, only a moment acting in the direction of tilting-down of the motor swash plate 20, of the vibratory tilting moments of the motor swash plate 20, assists the reversal torque of the electric motor 86, so that the reverse rotation of the electric motor 86 moves the motor swash plate 20 in a tilting down direction lightly.

Figure 21:
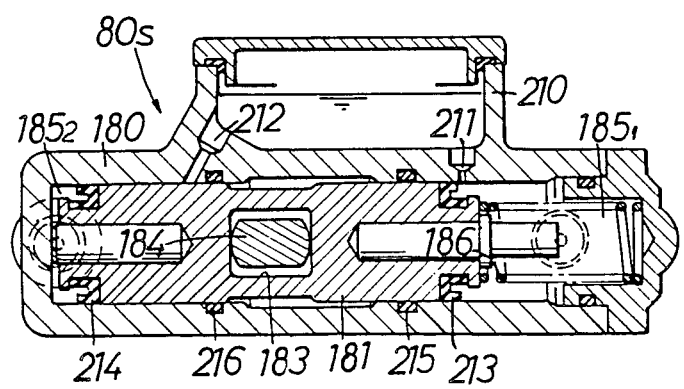
Figure 12:
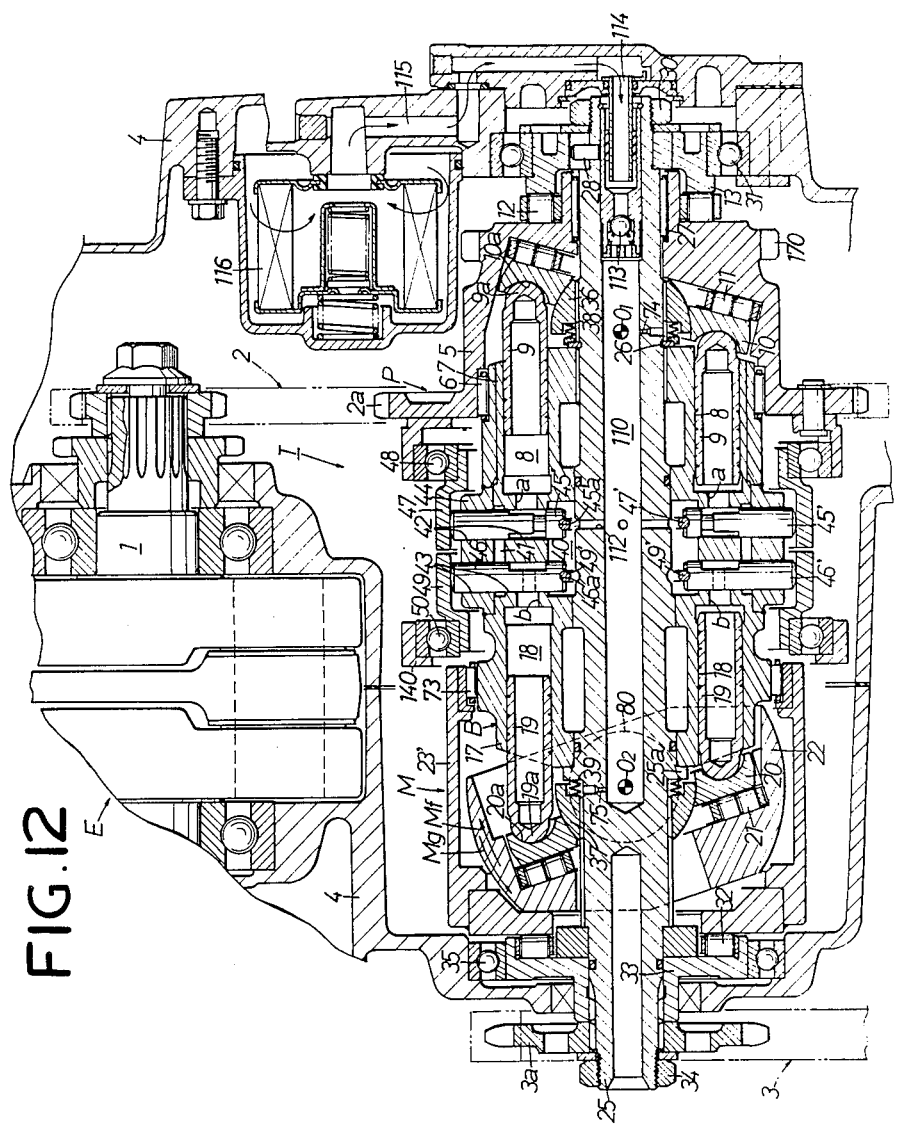
Figure 13:
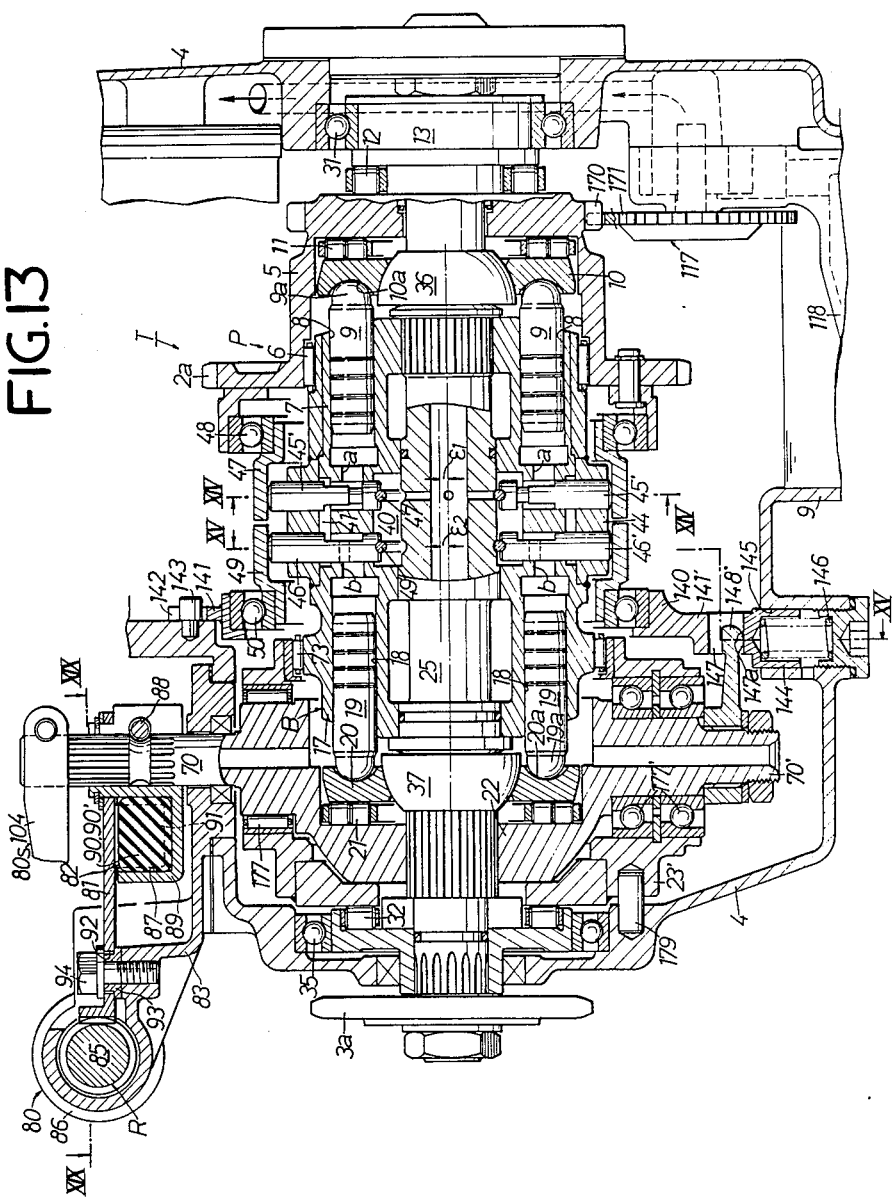

Referring to FIG. 21, a reservoir tank 210 is equipped on the cylinder 180, and a relief port 211 and a supply port 212 through which the reservoir tank 210 communicates with the interior of the cylinder 180 are perforated in an upper wall of the cylinder 180.

First and second cup seals 213 and 214 having a unidirectional sealing function are mounted on the outer periphery at opposite ends of the piston 181 in close contact with the inner peripheral surface of the cylinder 180, and O-rings 215 and 216 are mounted on the inner periphery of the cylinder 180 in close contact with the outer peripheral surface at axially intermediate portions of the piston 181 on the opposite sides of the window 182.

The relief port 211 is opened into the first oil chamber $185_1$ just in front of the first cup seal 213 when the piston 181 is located at a left limit of movement in FIG. 21 (corresponding to the upper limit of movement in FIG. 20), and the supply port 212 is always opened to the inner surface of the cylinder 180 between the second cup seal 214 and the O-ring 216.

Thus, with the piston 181 located at the aforesaid left limit of movement, if the pressure increases within the first oil chamber $185_1$, then such pressure is released through the relief port 211 into the reservoir tank 210. During rightward movement of the piston 181, the first oil chamber $185_1$ is pressurized by the piston 181 from the instant when the first cup seal 213 has passed an opening of the relief port 211, thereby permitting the oil flow from the first oil chamber $185_1$ into the second oil chamber $185_2$. In this case, if the second oil chamber $185_2$ is depressurized to below a predetermined pressure, a difference in pressure between the reservoir tank 210 and the second oil chamber $185_2$ causes the oil in the reservoir tank 210 to be passed from the supply port 212 through a slide clearance between the cylinder 180 and the piston 181 and to be supplemented into the second oil chamber $185_2$ while deflexing the second cup seal 214 toward the second oil chamber $185_2$.

Figure 22:
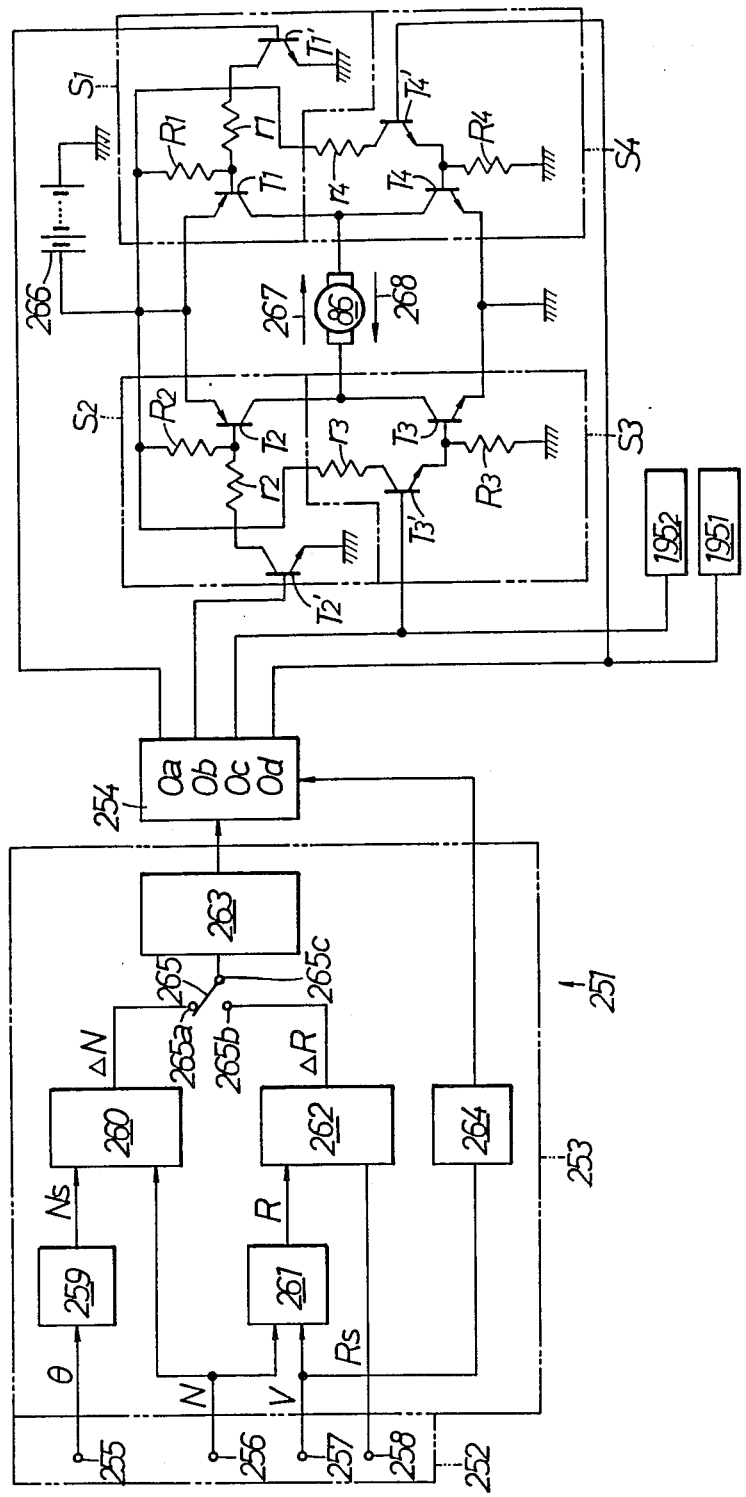

Referring to FIG. 22, connected to the electric motor 86 and both the solenoids $195_1$ and $195_2$ of the shift assisting device 80s in the shift control device 80 is an electronic control system 251 for controlling their operation.

The electronic control system 251 includes a detector section 252 for detecting the travelling state of a vehicle, a logical control section 253 for determining a shift control condition depending upon a detected signal from the detector section 252, and a drive control section 254 for outputting an actuating signal depending upon an output from the logical control section 253.

The detector section 252 comprises a detector 255 for detecting a throttle opening degree $\theta$, a detector 256 for detecting the number N of rotation of an engine, and a detector 257 for detecting a vehicle speed V, and also includes a setter 258 for inputting a setting shift ratio Rs.

The logical control section 253 comprises a desired rotational number setting circuit 259, a rotational number comparator circuit 260, a shift ratio calculator circuit 261, a shift ratio comparator circuit 262, a control signal producing circuit 263, a control start deciding circuit 264, and an automatic-to-manual change switch 265.

A shift map having desired engine rotational numbers Ns determined depending upon the throttle opening degree $\theta$ has been set in the desired rotational number setting circuit 259, so that a signal corresponding to a desired engine rotational number Ns is outputted depending upon a signal input indicative of a throttle opening degree $\theta$ from the detector 255. A plurality of types of the aforesaid shift maps have been prepared and therefore, for example, it is possible for a driver to freely select three types of maps for high power driving, low fuel consumption driving and normal driving.

A signal corresponding to the aforesaid desired engine rotational number Ns and a signal corresponding to a detected engine rotational number N from the detector 256 are inputted into the rotational number comparator circuit 260 where both signals are compared. That is, a calculation represented by $$\Delta N = Ns - N$$

is effected in the rotational number comparator circuit 260, and then, a signal corresponding to a subtracted value $\Delta N$ is outputted.

The detectors 256 and 257 are connected to the shift ratio calculator circuit 261. More specifically, a signal corresponding to an engine rotational number N detected in the detector 256 and a signal corresponding to a vehicle speed V detected in the detector 257 are inputted into the shift ratio calculator circuit 261 where a shift ratio R is calculated on the basis of the engine rotational number N and the vehicle speed V, and a signal corresponding to the shift ratio R is outputted therefrom.

A signal corresponding to the aforesaid shift ratio R and a signal corresponding to the shift ratio Rs set in the setter 258 are inputted into the shift ratio comparator 262 where these input signals are compared. That is, a calculation on the basis of an equation:

$$\Delta R = Rs - R$$

is effected in the shift ratio comparator circuit 262 and a signal corresponding to a subtracted value $\Delta R$ is outputted therefrom.

The automatic-to-manual change switch 265 is switchable alternatively between a state in which a common contact 265c is connected to an automatic-side separate contact 265a and a state in which the common contact 265c is connected to a manual-side separate contact 265b. An output terminal of the rotational number comparator circuit 260 is connected to the automatic-side separate contact 265a, and an output terminal of the shift ratio comparator 262 is connected to the manual-side separate contact 265b. The common contact 265c is connected to the control signal producing circuit 263. Thus, when the common contact 265c is connected to the automatic-side separate contact 265a, a signal corresponding to a value ΔN given by subtraction of a detected engine rotational number N from the desired engine rotational number Ns is inputted into the control signal producing circuit 263, and when the common contact 265c is connected to the manual-side separate contact 265b, a signal corresponding to a value ΔR given by subtraction of a calculated shift ratio R from the set shift ratio Rs is inputted into the control signal producing circuit 263.

In the control signal producing circuit 263, the ΔN and ΔR are compared with given values α and β, and on the basis of the results, an acceleration control signal H, a deceleration control signal L and a constant speed control signal S are outputted as given in Table 1.

TABLE 1

| | |
|---|---|
| ΔN < α<br>ΔR > β | H |
| ΔN < −α<br>ΔR < −β | L |
| \|ΔN\| ≦ α<br>\|ΔR\| ≦ β | S |

A signal corresponding to a detected vehicle speed V from the detector 257 is inputted into the control start deciding circuit 264 where that vehicle speed V is compared with a preset vehicle speed Vs. When V>Vs, an initializing signal is inputted into the drive control section 254 for initializing the drive control section 254 to convert it into a deceleration mode.

The drive control section 254 includes four output terminals Oa, Ob, Oc and Od and outputs a high or low level driving signal as given in Table 2 from the individual output terminals Oa to Od in response to an input signal from the control signal producing circuit 263.

TABLE 2

| Output terminal | Input signal | | |
|---|---|---|---|
| | H | L | S |
| Oa | low | high | low |
| Ob | high | low | low |
| Oc | low | high | low |
| Od | high | low | low |

A serial circuit comprising a first switching circuit S1 and a fourth switching circuit S4 and a serial circuit comprising a second switching circuit S2 and a third switching circuit S3 are connected in parallel to a DC power source 266 of the electric motor 86. The motor 86 is connected between a junction of the first and fourth switching circuits S1 and S4 and a junction of the second and third switching circuits S2 and S3. This enables energization of the electric motor 86 to be controlled to switch its operation mode between an accelerating mode (normal rotation of arrow 267), a decelerating mode (reverse rotation of arrow 268) and a deenergized mode depending upon the combination of switching modes of the first to fourth switching circuits S1 to S4.

The first to fourth switching circuits S1 to S4 are controlled their switching by the corresponding output terminals Oa to Od of the drive control section 254, respectively. A PNP transistor T1 of the first switching circuit S1 and an NPN transistor T4 of the fourth switching circuit S4 are connected in series to the DC power source 266, while a PNP transistor T2 of the second switching circuit S2 and an NPN transistor T3 of the third switching circuit S3 are connected in series to the DC power source 266 in parallel to both the transistors T1 and T4, and the electric motor 86 is connected between a junction of the transistors T1 and T4 and a junction of the transistors T2 and T3.

In the first switching circuit S1, a serial circuit comprising resistors R1 and r1 and an NPN transistor T1' is connected to the DC power source 266, and a point between the resistors R1 and r1 is connected to a base of the PNP transistor T1. In the second switching circuit S2, a serial circuit comprising resistors R2 and r2 and an NPN transistor T2' is connected to the DC power source 266, and a point between the resistors R2 and r2 is connected to a base of the PNP transistor T2. In the third switching circuit S3, a serial circuit comprising a resistor r3, an NPN transistor T3' and a resistor R3 is connected to the DC power source 266, and a point between the NPN transistor T3' and the resistor R3 is connected to a base of the NPN transistor T3. Further, in the fourth switching circuit S4, a serial circuit comprising a resistor r4, and NPN transistor T4' and a resistor R4 is connected to the DC power source 266, and a point between the NPN transistor T4' and the resistor R4 is connected to a base of the NPN transistor T4.

The output terminals Oa to Od of the drive control section 264 are independently connected to the bases of the transistors T1' to T4' of the first to fourth switching circuits S1 to S4, respectively. Thus, when an output from each of the output terminals Oa to Od is at a high level, each of the transistors T1' to T4' conducts and each of the transistors T1 to T4 conducts. When an output from each of the output terminals Oa to Od is at a low level, each of the transistors T1' to T4' is turned off and each of the transistors T1 to T4 is also turned off.

Therefore, when a control signal from the control signal producing circuit 263 is H, the second and fourth switching circuits S2 and S4 conduct to energize the electric motor 86 in the accelerating direction, and when such control signal is L, the first and third switching circuit S1 and S3 conduct to energize the electric motor 86 in the decelerating direction. When the control signal is S, the individual switching circuits S1 to S4 are interrupted to deenergize the electric motor 86.

The solenoid 195$_2$ is connected to the output terminal Oc of the drive control section 254 and is excited when an output from the output terminal Oc is at a high level, i.e., when the electric motor 86 is energized in the decelerating mode. Also, the solenoid 195$_1$ is connected to the output terminal Od of the drive control section 264 and is excited when an output from the output terminal Od is at a high level, i.e., when the electric motor 86 is energized in the accelerating mode.

If the shift control device 80 is controlled in operation in the electronic control system 251 in this manner, it is easy to effect a shift control according to a will of a driver. That is, it is extremely easy to change the setting of the shift maps, and the automatic-to-manual switching is also possible, thus making it possible to meet a variety of running operations of a vehicle.

What is claimed is:

1. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device which is constructed so as to transmit rotation of said electric motor to said trunnion shaft at a reduced speed but to be brought into a locked state when receiving a reverse load from said trunnion shaft, and means is provided to control the operation of said reversible electric motor, said control means being capable of selectively assuming a first state in which said electric motor is controlled according to a load of an engine associated with said transmission and a second state in which said electric motor is controlled according to a shift ratio of said transmission.

2. A shift control device in a hydrostatic continuously variable transmission according to claim 1 wherein said reduction device comprises a sector gear connected to the trunnion shaft and a worm gear meshed with said sector gear and connected to the drive shaft of said electric motor.

3. A shift control device in a hydrostatic continuously variable transmission according to claim 1 wherein said reduction device is connected to the trunnion shaft through a damper.

4. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device which is constructed so as to transmit rotation of said electric motor to said trunnion shaft at a reduced speed but to be brought into a locked state when receiving a reverse load from said trunnion shaft, wherein an operating lever is secured to the trunnion shaft and is operatively connected with a piston slidably received in a stationary cylinder, and first and second oil chambers defined between said cylinder and said piston and opposed to each other with the piston sandwiched therebetween are interconnected through a hydraulic conduit, and wherein interposed in said hydraulic conduit is a control valve selectively switchable into a hold position in which said conduit is brought into a blocked state during an inoperative state of said electric motor, a decelerating position in which during normal rotation of said electric motor said conduit is brought into a state to communicate only in one direction from said first oil chamber to said second oil chamber and an accelerating position in which during reverse rotation of said electric motor the conduit is brought into a state to communicate only in one direction from said second oil chamber to said first oil chamber.

5. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device which is constructed so as to transmit rotation of said electric motor to said trunnion shaft at a reduced speed but to be brought into a locked state when receiving a reverse load from said trunnion shaft, wherein said reduction device is connected to the trunnion shaft through a damper, and wherein said damper comprises a damper body secured to said trunnion shaft, at least one buffer member associated with said damper body, and a transmitting piece interacting with said buffer member for transmitting a rotation of said trunnion shaft.

6. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device which is constructed so as to transmit rotation of said electric motor to said trunnion shaft at a reduced speed but to be brought into a locked state when receiving a reverse load from said trunnion shaft, wherein an operating lever is secured to the trunnion shaft and is operatively connected with a piston slidably received in a stationary cylinder, and first and second oil chambers defined between said cylinder and said piston and opposed to each other with the piston sandwiched therebetween are interconnected through a hydraulic conduit, and wherein interposed in said hydraulic conduit is a control valve selectively switchable into a hold position in which said conduit is brought into a blocked state during an inoperative state of said electric motor, a decelerating position in which during normal rotation of said electric motor said conduit is brought into a state to communicate only in one direction from said first oil chamber to said second oil chamber and an accelerating position in which during reverse rotation of said electric motor the conduit is brought into a state to communicate only in one direction from said second oil chamber to said first oil chamber, and wherein when said control valve is selectively switched into said decelerating position a vibratory tilting moment of said motor swash plate acts as an urging force on said piston to urge oil to flow from said first oil chamber to said second oil chamber, and when said control valve is selectively switched into said accelerating position a vibratory tilting moment of said motor swash plate acts as an urging force on said piston to urge oil to flow from said second oil chamber to said first oil chamber.

7. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate so as to swing said swash plate in one of two opposite directions, vibratory tilting moments of the motor swash plate which act only in said one direction are utilized as an assisting force for the electric motor and means is provided to prevent vibratory tilting moments of the swash plate acting in the other direction from being transmitted to the electric motor.

8. A shift control device in a hydrostatic continuously variable transmission according to claim 7, wherein said reduction device comprises a first gear connected to the trunnion shaft and a second gear meshed with said first gear and connected to the drive shaft of said electric motor, said second gear being capable of driving said first gear but said first gear being incapable of driving said second gear.

9. A shift control device in a hydrostatic continuously variable transmission according to claim 8, wherein said first gear is a sector gear and said second gear is a worm gear.

10. A shift control device in a hydrostatic continuously variable transmission according to claim 7, wherein said reduction device is connected to the trunnion shaft through a damper.

11. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the motor swash plate assist the electric motor, wherein said reduction device is connected to the trunnion shaft through a damper, said damper comprising a damper body secured to said trunnion shaft, at least one buffer member associated with said damper body, and a transmitting piece interacting with said buffer member for transmitting a rotation of said trunnion shaft.

12. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the motor swash plate assist the electric motor, wherein an operating lever is secured to the trunnion shaft and is operatively connected with a piston slidably received in a stationary cylinder, and first and second oil chambers defined between said cylinder and said piston and opposed to each other with the piston sandwiched therebetween are interconnected through a hydraulic conduit, and wherein interposed in said hydraulic conduit is a control valve selectively switchable into a hold position in which said conduit is brought into a blocked state during an inoperative state of said electric motor, a decelerating position in which during normal rotation of said electric motor said conduit is brought into a state to communicate only in one direction from said first oil chamber to said second oil chamber and an accelerating position in which during reverse rotation of said electric motor the conduit is brought into a state to communicate only in one direction from said second oil chamber to said first oil chamber.

13. A shift control device in a hydrostatic continuously variable transmission in which a hydraulic closed circuit is formed between a swash plate type hydraulic pump and a swash plate type hydraulic motor, and a swash plate holder for supporting a motor swash plate of the hydraulic motor is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the motor swash plate assist the electric motor, wherein an operating lever is secured to the trunnion shaft and is operatively connected with a piston slidably received in a stationary cylinder, and first and second oil chambers defined between said cylinder and said piston and opposed to each other with the piston sandwiched therebetween are interconnected through a hydraulic conduit, and wherein interposed in said hydraulic conduit is a control valve selectively switchable into a hold position in which said conduit is brought into a blocked state during an inoperative state of said electric motor, a decelerating position in which during normal rotation of said electric motor said conduit is brought into a state to communicate only in one direction from said first oil chamber to said second oil chamber and an accelerating position in which during reverse rotation of said electric motor the conduit is brought into a state to communicate only in one direction from said second oil chamber to said first oil chamber, wherein when said control valve is selectively switched into said decelerating position a vibratory tilting moment of said motor swash plate acts as an urging force on said piston to urge oil to flow from said first oil chamber to said second oil chamber, and when said control valve is selectively switched into said accelerating position a vibratory tilting moment of said motor swash plate acts as an urging force on said piston to urge oil to flow from said second oil chamber to said first oil chamber.

14. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate so as to swing said swash plate in one of two opposite directions, vibratory tilting moments of the swash plate which act only in said one direction are utilized as an assisting force for the electric motor and means is provided to prevent vibratory tilting moments of the swash plate acting in the other direction from being transmitted to the electric motor.

15. A shift control device in a hydrostatic continuously variable transmission according to claim 14 wherein a position regulating means is provided to regulate upright and tilted-down positions of said swash plate.

16. A shift control device in a hydrostatic continuously variable transmission according to claim 15 wherein said position regulating means comprises a pair of mutually engagable members which are adapted to engage with each other so as to define maximum upright and tilted-down positions of said swash plate.

17. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the swash plate assist the electric motor, wherein means is provided to control the operation of said reversible electric motor in such a manner that the motor is actuated to move the swash plate in an accelerating direction when a number of rotation of an engine associated with the transmission and a shift ratio of the transmission are lower than respective desired levels by more than predetermined values, that the motor is actuated to move the swash plate in a decelerating direction when the number of rotation of the engine and the shift ratio are higher than said respective desired levels by more than said predetermined values, and that the motor is controlled to hold the swash plate in a current position thereof when a difference between the number of rotation of the engine and its desired level and a difference between the shift ratio and its desired level are, in respective absolute values, not higher than said predetermined values.

18. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the swash plate assist the electric motor, wherein means to control the operation of said reversible electric motor are provided, said means to control being switchable between a first state in which said electric motor is controlled according to a number of rotation of an engine associated with said transmission and a second state in which said electric motor is controlled according to a shift ratio of said transmission.

19. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the swash plate assist the electric motor, and wherein means to control the operation of said reversible electric motor are provided, said means to control being switchable between a first state in which said electric motor is controlled according to a number of rotation of an engine associated with said transmission and a second state in which said electric motor is controlled according to a shift ratio of said transmission, wherein when said means to control is in said first state the motor is actuated to move the swash plate in an accelerating direction when said number of rotation of said engine is lower than a desired level by more than a predetermined value, the motor is actuated to move the swash plate in a decelerating direction when the number of rotation of the engine is higher than said desired level by more than said predetermined value, and the motor is controlled to hold the swash plate in a current position thereof when a difference between the number of rotation of the engine and its desired level is, in absolute value, not higher than said predetermined value.

20. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced -speed but to be brought into a locked state when receiving a reverse load from said trunnion shaft, wherein during said selective adjustment of the angle of inclination of said swash plate vibratory tilting moments of the swash plate assist the electric motor, and wherein means to control the operation of said reversible electric motor are provided, said means to control being switchable between a first state in which said electric motor is controlled according to a number of rotation of an engine associated with said transmission and a second state in which said electric motor is controlled according to a shift ratio of said transmission, wherein when said means to control is in said second state the motor is actuated to move the swash plate in an accelerating direction when said shift ratio of the transmission is lower than a desired level by more than a predetermined value, the motor is actuated to move the swash plate in a decelerating direction when the shift ratio is higher than said desired level by more than said predetermined value, and the motor is controlled to hold the swash plate in a current position thereof when a difference between the shift ratio and its desired level is, in absolute value, not higher than said predetermined value.

21. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the swash plate assist the electric motor, and wherein means to control the operation of said reversible electric motor are provided, said means to control being switchable between a first state in which said electric motor is controlled according to a number of rotation of an engine associated with said transmission and a second state in which said electric motor is controlled according to a shift ratio of said transmission, wherein said means to control comprises a detector section for detecting the travelling state of a vehicle, a logical control section operatively connected to said detector section for determining a shift control condition depending on signals from said detector section, and a drive control section operatively connected to said logical control section and said motor for outputting an actuating signal to operate said motor depending upon an output from said logical control section.

22. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the swash plate assist the electric motor, and wherein means to control the operation of said reversible electric motor are provided, said means to control being switchable between a first state in which said electric motor is controlled according to a number of rotation of an engine associated with said transmission and a second state in which said electric motor is controlled according to a shift ratio of said transmission, wherein said means to control comprises a detector section for detecting the travelling state of a vehicle, a logical control section operatively connected to said detector section for determining a shift control condition depending on signals from said detector section, and a drive control section operatively connected to said logical control section and said motor for outputting an actuating signal to operate said motor depending upon an output from said logical control section, wherein said detector section detects a throttle opening degree, said number of rotation of said engine, the speed of said vehicle, and a setting shift ratio.

23. A shift control device in a hydrostatic continuously variable transmission having a swash plate type hydraulically operated device in which a swash plate holder for supporting a swash plate of the hydraulically operated device is tiltably supported on a stationary structure through a trunnion shaft fixedly mounted to said swash plate holder, wherein a drive shaft of a reversible electric motor is connected to the trunnion shaft through a reduction device to selectively adjust the angle of inclination of said swash plate, said reduction device being constructed so as to transmit rotation of said electric motor to said trunnion shaft at a reduced speed but to be brought into a locked state when receiving a reverse load from said trunnion shaft, wherein during said selective adjustment of the angle of inclination of said swash plate vibratory tilting moments of the swash plate assist the electric motor, and wherein means to control the operation of said reversible electric motor are provided, said means to control being switchable between a first state in which said electric motor is controlled according to a load of an engine associated with said transmission and a second state in which said electric motor is controlled according to a shift ratio of said transmission.

24. A shift control device in a hydrostatic continuously variable transmission according to claim 23, wherein said load of the engine is shown by a number of rotation of the engine.

* * * * *